United States Patent
Wu et al.

(10) Patent No.: US 9,135,139 B2
(45) Date of Patent: Sep. 15, 2015

(54) METHODS AND SYSTEMS TO IDENTIFY AND REPRODUCE CONCURRENCY VIOLATIONS IN MULTI-THREADED PROGRAMS USING EXPRESSIONS

(75) Inventors: Youfeng Wu, Palo Alto, CA (US); Justin E. Gottschlich, Fort Collins, CO (US); Gilles Pokam, Fremont, CA (US); Shiliang Hu, San Jose, CA (US); Ali-Reza Adl-Tabatabai, San Jose, CA (US); Cristiano L. Pereira, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/535,334

(22) Filed: Jun. 27, 2012

(65) Prior Publication Data

US 2014/0007054 A1     Jan. 2, 2014

(51) Int. Cl.
G06F 7/38         (2006.01)
G06F 9/00         (2006.01)
G06F 9/44         (2006.01)
G06F 11/00        (2006.01)
G06F 9/45         (2006.01)
G06F 3/00         (2006.01)
G06F 9/46         (2006.01)
G06F 13/00        (2006.01)
G06F 11/36        (2006.01)

(52) U.S. Cl.
CPC ............ G06F 11/36 (2013.01); G06F 11/3632 (2013.01)

(58) Field of Classification Search
CPC ..... G06F 9/524; G06F 9/3828; G06F 9/3824; G06F 11/3636; G06F 11/3648; G06F 8/427
See application file for complete search history.

(56) References Cited

U.S. PATENT DOCUMENTS

| | | | |
|---|---|---|---|
| 6,009,269 A | 12/1999 | Burrows et al. | |
| 7,100,157 B2 | 8/2006 | Collard | |
| 7,539,979 B1 * | 5/2009 | Nir-Buchbinder | 717/131 |
| 7,673,181 B1 | 3/2010 | Lindo et al. | |
| 8,510,722 B2 * | 8/2013 | Yang et al. | 717/131 |
| 8,572,606 B1 | 10/2013 | Agesen et al. | |
| 2002/0035722 A1 | 3/2002 | McKinsey et al. | |
| 2003/0233394 A1 | 12/2003 | Rudd et al. | |

(Continued)

OTHER PUBLICATIONS

Campbell et al., "Path Expressions in Pascal," Proceedings of the 4th International Conference on Software Engineering (ICSE) 1979, IEEE Press, Piscataway, NJ (8 pages).

(Continued)

*Primary Examiner* — Don Wong
*Assistant Examiner* — Anibal Rivera
(74) *Attorney, Agent, or Firm* — Hanley, Flight & Zimmerman, LLC

(57) ABSTRACT

Methods and systems to identify and reproduce concurrency bugs in multi-threaded programs are disclosed. An example method disclosed herein includes defining a data type. The data type includes a first predicate associated with a first thread of a multi-threaded program that is associated with a first condition, a second predicate that is associated with a second thread of the multi-threaded program, the second predicate being associated with a second condition, and an expression that defines a relationship between the first predicate and the second predicate. The relationship, when satisfied, causes the concurrency bug to be detected. A concurrency bug detector conforming to the data type is used to detect the concurrency bug in the multi-threaded program.

20 Claims, 21 Drawing Sheets

(56) References Cited

U.S. PATENT DOCUMENTS

| | | | |
|---|---|---|---|
| 2005/0102681 A1 | 5/2005 | Richardson | |
| 2006/0161897 A1* | 7/2006 | Biberstein et al. | 717/124 |
| 2007/0168986 A1 | 7/2007 | Pangburn | |
| 2008/0201629 A1* | 8/2008 | Duesterwald et al. | 714/798 |
| 2008/0250422 A1 | 10/2008 | Lewis | |
| 2009/0100432 A1 | 4/2009 | Holloway et al. | |
| 2009/0113399 A1* | 4/2009 | Tzoref et al. | 717/130 |
| 2009/0125887 A1* | 5/2009 | Kahlon et al. | 717/126 |
| 2009/0178044 A1* | 7/2009 | Musuvathi et al. | 718/102 |
| 2010/0050161 A1* | 2/2010 | Nir-Buchbinder et al. | 717/126 |
| 2010/0070955 A1* | 3/2010 | Kahlon | 717/141 |
| 2010/0131931 A1* | 5/2010 | Musuvathi et al. | 717/128 |
| 2011/0022893 A1* | 1/2011 | Yang et al. | 714/33 |
| 2011/0131550 A1* | 6/2011 | Burckhardt et al. | 717/124 |
| 2011/0161590 A1 | 6/2011 | Guthrie et al. | |
| 2011/0173422 A1 | 7/2011 | Chen et al. | |
| 2011/0173592 A1 | 7/2011 | Elnozahy et al. | |
| 2011/0258421 A1* | 10/2011 | Elnozahy et al. | 717/124 |
| 2012/0017221 A1* | 1/2012 | Hankins et al. | 719/318 |
| 2012/0144372 A1* | 6/2012 | Ceze et al. | 717/124 |
| 2012/0174074 A1 | 7/2012 | Ganai | |
| 2012/0204062 A1 | 8/2012 | Erickson et al. | |
| 2012/0204154 A1* | 8/2012 | Li et al. | 717/124 |
| 2013/0031531 A1* | 1/2013 | Keynes et al. | 717/126 |
| 2013/0097136 A1 | 4/2013 | Goldberg | |
| 2014/0108860 A1 | 4/2014 | Agesen et al. | |
| 2014/0115604 A1 | 4/2014 | Gottschlich et al. | |
| 2014/0282423 A1 | 9/2014 | Gottschlich et al. | |

OTHER PUBLICATIONS

Schwartz-Narbonne et al., "Parallel Assertions for Debugging Parellel Programs," 2011 9th IEEE/ACM International Conference on Formal Methods and Models for Codesign (MEMOCODE), Jul. 2011.

Siegel et al., "Collective Assertions," VMCAI'11 Proceedings of the 12th international conference on verification model checking, and abstract interpretation, 2011, (17 pages).

"Methods and Systems to Identify and Reproduce Concurrency Violations in Multi-Threaded Programs", PCT patent application No. PCT/US11/66520 filed Dec. 21, 2011 (50 pages).

International Searching Authority, "International Search Report" issued in connection with PCT application No. PCT/US2011/066520, mailed Aug. 31, 2012 (3 pages).

International Searching Authority, "Written Opinion" issued in connection with PCT application No. PCT/US2011/066520, mailed Aug. 31, 2012 (5 pages).

Park et al., "Concurrent Breakpoints," Electrical Engineering and Computer Sciences, University of California at Berkeley, Technical Report No. UCB/EECS-2011-159, Dec. 18, 2011, 15 pages.

Wikipedia, "Happened-before," retrieved from Wikipedia on Jan. 16, 2013, 2 pages.

Gottschlich et al., "Concurrent Predicates: Finding and Fixing the Root Cause of Concurrency Violations," Usenix Hotpar, Berkeley, CA, 2012, 7 pages.

Wikipedia, "Java Memory Model," retrieved from Wikipedia on Jan. 16, 2013, 3 pages.

"Methods and Apparatus to Manage Concurrent Predicate Expressions," U.S. Appl. No. 13/827,121, filed Mar. 14, 2013 (48 pages).

International Searching Authority, "The Written Opinion of the International Searching Authority," issued in connection with corresponding International Patent Application No. PCT/US2014/011424, mailed Apr. 29, 2014 (4 pages).

International Searching Authority, "The International Search Report," issued in connection with corresponding International Patent Application No. PCT/US2014/011424, mailed Apr. 29, 2014 (5 pages).

The United States Patent and Trademark Office, "Non-Final Office Action," issued in connection with U.S. Appl. No. 13/827,121 mailed on Jul. 7, 2014 (39 pages).

Gottschlich et al., "Methods and Apparatus to Manage Concurrent Predicate Expessions" PCT patent application No. 2014/011424 filed Jan. 14, 2014 (40 pages).

Gottschlich et al., "Methods and Systems to Identify and Reproduce Concurrence Violations in Multi-Threaded Programs", PCT patent application No. PCT/US11/66520 filed Dec. 21, 2011 (50 pages).

Dinsdale-Young et al., "Concurrent Abstract Predicates," ECOOP 2010, Lecture Notes in Computer Science, vol. 6483, pp. 504-528.

Ceze et al., "A Case for System Support for Concurrency Exceptions," Mar. 2009, USENIX Conference, 12 pages.

The United States Patent and Trademark Office, "Notice of Allowance," issued in connection with U.S. Appl. No. 13/827,121, dated Mar. 30, 2015, 125 pages.

The United States Patent and Trademark Office, "Non-Final Office Action," issued in connection with U.S. Appl. No. 13/994,063, on Apr. 27, 2015, 68 pages.

* cited by examiner

```
CPE1:   CPE bug_name (string error_message){
CPE2:       Variables v1, v2, ... vm;
CPE3:       Predicates P1(condition, P2(condition,...,Pn(condition);
CPE4:       Expression E(P1, P2, ..., Pn);
CPE5:   }
```

FIG. 3A

| Expressions | Meanings |
|---|---|
| e1 = (P1 >& P2) | P1 is satisfied first and thread1 is stalled until P2 satisfied |
| e2 = (P1 && P2) | equal to ((P1>&P2) or (P2>& P1)) |
| e3 = (P1 \|\| P2) | P1 or P2 satisfied |
| e4 = (P1 > P2) | P1 is satisfied and then P2 is satisfied |
| e5 = (P ^ n) | n copies of P are satisfied concurrently |
| e6 = (P # n) | P is satisfied n times |

CPE1: CPE bug2("Attempt To Access A Removed Element Due to Atomicity Violation at L1 of thread1 and L2 of thread2"){
CPE2:    Int removed_id = INVALID_ID;
CPE3:    Predicates P1(condition), P2(condition);
CPE4:    Expression (P2>&P1);
CPE5: }

Thread 1
$T1_1$: while(true)
$T1_2$: {
$T1_3$:    lock(L);
$T1_4$:    id = random();
$T1_5$:    cont.insert(id);
$T1_6$:    unlock(L);

P1
L1: bug2.P1(STALL(5) && id == bug2.removed_id && cont.find(id) == cont.end());

$T1_7$:    lock(L);
$T1_8$:    cout<<cont.find(id)<<endl;//potential crash
$T1_9$:    unlock(L);
$T1_{10}$:}

Thread 2
$T2_1$: while(true);
$T2_2$: {
$T2_3$:    lock(L);
$T2_4$:    id = random();
$T2_5$:    cont.erase(id);
$T2_6$:    unlock(L);

P2
L2: bug2.P2(bug2.removed_id = id);

```
                                                                      ← 600
CPE1:  CPE bug3("Dead Lock Due to Inconsistent Lock Acquire Ordering"){
CPE2:     Predicates P11(condition), P12(condition), P21(condition), P22(condition);
CPE3:     Expression (P11 && P22) || P21 && P12)
CPE4:  }
```

```
T1₁:  //T1
T1₂:  while (count > 0)
T1₃: {
T1₄:     pthread_mutex_t*lock_one,*lock_two;
T1₅:     if ((rand() % 100) = = 0)                       602
T1₆:     {
T1₇:         lock_one = &B; lock_two = &A;
T1₈:     }
T1₉:     else
T1₁₀:    {
T1₁₁:        lock_one = &A; lock_two = &B;
T1₁₂:    }
T1₁₃:    lock(lock_one);
```

```
L1:    bug3.P11(lock_one == B); bug3.P12(lock_one ==A);
```

```
T1₁₄:   cout << "running..." << endl;
T1₁₅:   lock(lock_two);
T1₁₆:   unlock(lock_one); unlock(lock_two);
T1₁₇: }
```

```
T2₁:  //T2
T2₂:  while (count > 0)
T2₃: {
T2₄:     pthread_mutex_t*lock_one,*lock_two;
T2₅:     if ((rand() % 100) = = 0)
T2₆:     {
T2₇:         lock_one = &B; lock_two = &A;
T2₈:     }
T2₉:     else
T2₁₀:    {
T2₁₁:        lock_one = &A; lock_two = &B;
T2₁₂:    }
T2₁₃:    lock(lock_one);
```

```
L2:    bug3.P21(lock_one == B); bug3.P22(lock_one ==A);
```

```
T2₁₄:   cout << "running..." << endl;
T2₁₅:   lock(lock_two);
T2₁₆:   unlock(lock_one); unlock(lock_two);
T2₁₇: }
```

FIG. 6

```
CPE1:  CPE bug4 ("Divide By Zero Bug at L1 and L2"){
CPE2:      Predicates P1(condition), P2(condition), P3(condition);
CPE3:      Expression (P2>(P1>&P3));
CPE4:  }
```
⎯ 700

702

```
//T1
T1_1:  while (true)
T1_2:  {
T1_3:      lock(L);
T1_4:      if (rand()!= 0)
T1_5:      {
T1_6:          ...
T1_7:      }
T1_8:      else cont.remove(...);
T1_9:      unlock();
```

| P1 |
|---|
| L1:  bug4.P1(cont.size() == 0); |

```
T1_10: }

//T2
T2_1:  while (true) ;
T2_2:  {
T2_3:      lock(L);
T2_4:      double total = 0;
T2_5:      for (auto i = cont.begin(); i!= cont.end; ++i)
T2_6:      {
T2_7:          total += *i;
T2_8:      }
T2_9:      unlock(L);
```

| P2 |
|---|
| L2:  bug4.P2(total != 0); |

| P3 |
|---|
| L3:  bug4.P3(STALL(5) && total != 0 && cont.size() == 0); |

```
T2_10:     if (total !=0) double ave = total / cont.size();
T2_11: }
```

FIG. 7

```
        //Declaration of CPE sample_bug2
CPE1:   CPE sample_bug2 (string "sample bug2"){
CPE2:       Predicates P0(condition), P1(condition), P2(condition);
CPE3:       Expression (P0>(P1^2&P2^3)#3)
CPE4: }

//Implementation generated by compiler for CPE sample_bug2
I1: CPE sample_bug2 {
I2:     Boolean P0_satisfied=false;
I3:     Int num_P1_satisfied=0;
I4:     Int num_P2_satisfied=0;
I5:     Int num_repeats = 0;
I6:     void P0(condition){
I7:         atomic { if (!P0_satisfied) P0_satisfied = eval (condition);}
I8:     }
I9:     void P1(condition){
I10:        atomic{
I11:            if(!P0_satisfied) return;
I12:            num_P1_satisfied += eval(condition)?1:0;
I13:        }
I14:        while (num_P1_satisfied < 2 && num_P2_satisfied < 3 && !time_out()) sleep();
I14: (cont.)   //barrier for P1^2 & P2^3
I15:    }
I16:    void P2(condition){
I17:        atomic{
I18:            if(!P0_satisfied) return;
I19:            num_P2_satisfied += eval(condition)?1:0;
I20:        }
I21:        while (num_P1_satisfied < 2 && num_P2_satisfied < 3 && !time_out()) sleep();
I21: (cont.)   //barrier for P1^2 & P2^3
I22:        atomic{
I23:            if(num_P1_satisfied == 2 && num_P2_satisfied==3) num_repeats ++;
I24:        }
I25:        num_P1_satisfied=0;
I26:        num_P2_satisfied=0;
I27:        if (num_repeats ==3){
I28:            P0_satisfied = 0;
I29:            report_bug("Atomicity violation bug");
I30:        }
I31:    }
I32: }
```

FIG. 9

METHODS AND SYSTEMS TO IDENTIFY AND REPRODUCE CONCURRENCY VIOLATIONS IN MULTI-THREADED PROGRAMS USING EXPRESSIONS

FIELD OF THE DISCLOSURE

This disclosure relates generally to multi-threaded programs and more particularly to debugging concurrency violations occurring in multi-threaded programs.

BACKGROUND

In recent years, concurrent/parallel programming, in which different computer programs execute simultaneously and access shared memory, has become quite popular. Concurrently executing programs that operate within the context of a single computer program are commonly referred to as threads of a multi-threaded program. Multi-threaded programming has inherent challenges both because of the simultaneous nature of the execution of the threads and because the different threads of the program have access to shared memory. As a result of the simultaneous executions of the threads, operations performed by the threads do not necessarily occur in any particular order. However, there are instances in which proper operation of the multi-threaded program requires that one or more of the operations performed in one or more threads occur in a specific order relative to the operations of one or more other threads. For example, two or more threads that access the same memory location may rely on a specific value or values being present in the shared memory location when that shared memory location is accessed. However, the specific value or values in the shared memory location when that memory location is accessed by any given thread may depend on the order in which one or more of the threads access the shared memory location. Further, the simultaneous operation of the various threads makes it difficult to control the order in which a shared memory location is accessed by any given thread in a multi-threaded program.

Fixing any computer error, or bug, including those caused by a concurrency violation generally involves reproducing the bug so that the bug can be properly identified and so that the responsible portions of the program can be modified to correct the bug. Debugging in the context of a serial program is fairly straightforward as it involves sequentially stepping through the instructions of the code until the bug occurs and then revising the instructions responsible for the bug. However, this method of debugging does not work well in a multi-threaded program because the order in which the instructions of the various threads of a multi-threaded program are executed is unknown and, indeed, may vary from execution to execution. In fact, a particular bug present in a multi-threaded program may not occur upon every execution of the program (i.e., the bug may be non-deterministic) making the bug extremely difficult to detect and debug.

BRIEF DESCRIPTION OF THE DRAWINGS

FIG. 3A illustrates an example data type, represented in pseudocode, defining an example data type format to which the bug detector of FIG. 1 is to conform when implemented.

FIG. 3B illustrates an example set of expressions used to implement a bug detector conforming to the example data type format of FIG. 3A.

FIG. 5 illustrates example operations, represented in pseudocode, performed by a bug detector conforming to the example data type of FIG. 3A in the context of a second multi-threaded program.

FIG. 6 illustrates example operations, represented in pseudocode, performed by a bug detector conforming to the example data type of FIG. 3A in the context of a third multi-threaded program.

FIG. 7 illustrates example operations, represented in pseudocode, performed by a bug detector conforming to the example data type of FIG. 3A in the context of a fourth multi-threaded program.

FIG. 9 illustrates example operations, represented in pseudocode, performed by a processor to execute a software implementation of a bug detector conforming to the example data type of FIG. 3A.

DETAILED DESCRIPTION

Figure 1:
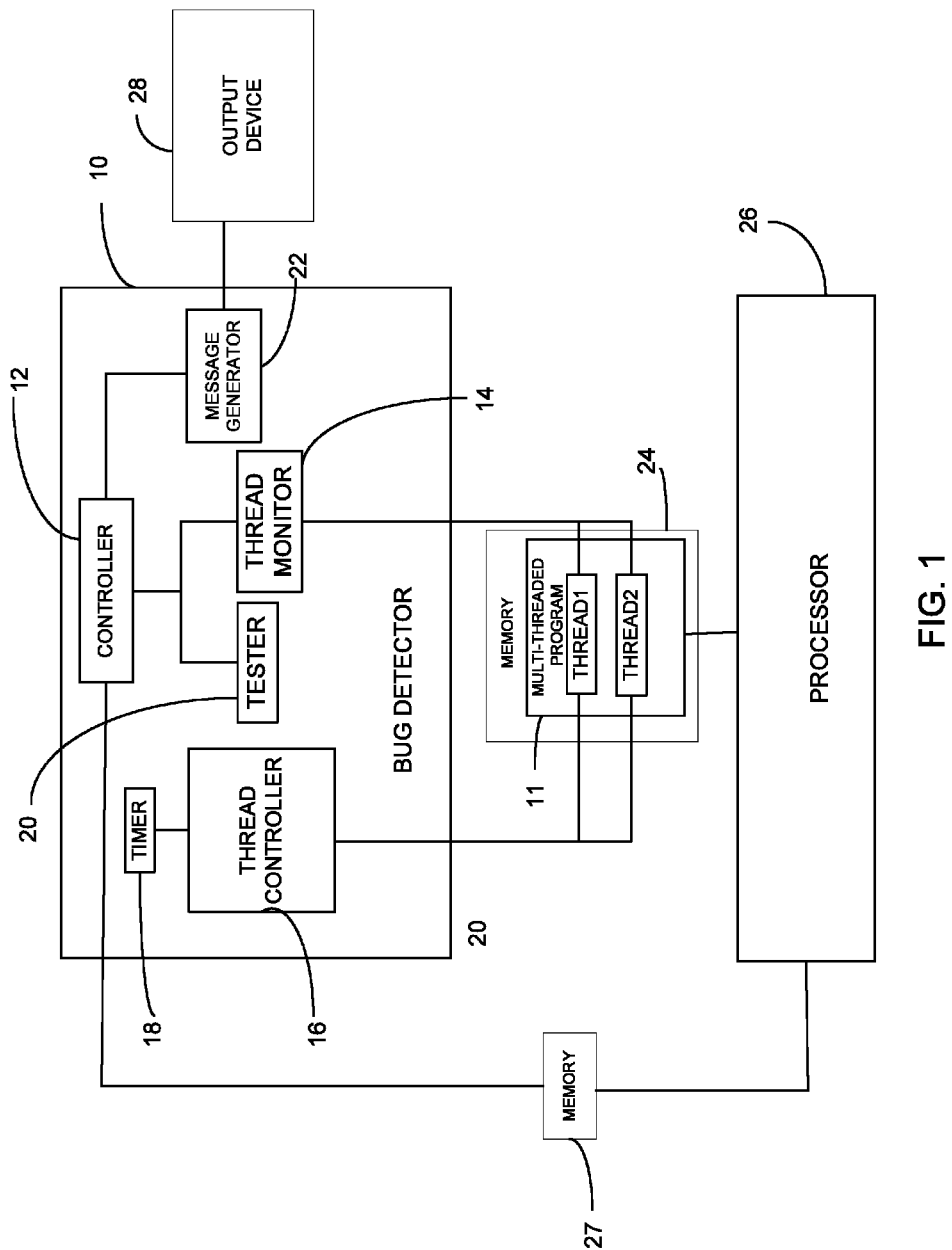
FIG. 1 is a block diagram of an example bug detector to detect a bug in a multi-threaded program.

Methods and systems to identify, reproduce and/or repair concurrency violations in multi-threaded programs are disclosed herein. In some example methods, one or more operations performed by a first thread, thread1, of a multi-threaded program are serialized relative to one or more operations performed by a second thread, thread2, of the example multi-threaded program when one or more conditions have been met. In at least some examples, the serialization of the operations of thread1 and thread2 causes a concurrency violation to occur.

Unlike existing debugging tools which are only able to identify that the execution of a multi-threaded program has resulted in one or more concurrency violations, debugging tools disclosed here are able to reproduce a concurrency violation so that the operations responsible for the violation are identified and can be revised. In addition, debugging tools disclosed here can be used after the program has been revised to determine whether the revisions have effectively removed the bug. Also, debugging tools disclosed here do not produce the false positives which may result from using existing debugging tools.

Example methods and systems disclosed herein include, detecting a bug in a multi-threaded program, defining a data type that includes a name of a bug, a first predicate associated with a first thread of the multi-threaded program, the first predicate specifying a condition, a second predicate associated with a second thread of the multi-threaded program, the second predicate specifying the condition and a relationship between the first predicate and the second predicate, the relationship, when present, causing the bug to be detected.

Some example methods and systems disclosed herein include defining an expression conforming to the data type, inserting the expression into the multi-threaded program, inserting the first predicate into the first thread, and inserting the second predicate into the second thread. Example methods and system disclosed can identify one or more bugs in the multi-threaded program by defining condition(s) (e.g., predicates) that, when concurrently satisfied by one or more of the threads of a multi-threaded program, will result in a specific type of bug called a concurrency violation. After being identified and defined, these concurrently satisfied predicates (e.g., concurrent predicates) are placed in the source code or instructions of one or more of the threads of the multi-threaded program. The order in which the concurrent predicates must be met (i.e., satisfied) is defined in an expression referred to as a Concurrent Predicate Expression (CPEs) that is converted by a compiler into executable code/instructions and used to control the scheduling of the threads of a multi-threaded program to pin-point and/or reproduce the concurrency violation/bug.

Using CPEs allows a programmer to consider and comprehend the thread interactions at a high level, without requiring the programmer to analyze the code/instructions in which the interaction occurs. This frees the programmer from the confines of the program's structure to allow reasoning directly about the cause of the concurrency violation. CPEs also reduce and even prevent the bug from being inadvertently hidden by way of an incorrect repair of the concurrency violation, a situation that commonly occurs when introducing code that changes thread scheduling (known as the "probe effect"). When a CPE is properly used, the programmer formally defines the bug and then uses that formal definition to attempt to reproduce the bug after a repair has been applied. If the bug can no longer be reproduced after the repair has been applied, the programmer has some degree of confidence, and in some cases proof, that the repair has removed the bug.

An assertion is one technique used to effectively identify and/or prevent a concurrency violation in serial programs. An assertion is a condition (also called a predicate) placed in a program at a specific location and identifies a predicate that is assumed to be true at that specific location. If an assertion evaluates to false at run time, an assertion failure occurs, which typically causes execution of the computer program to abort. This draws attention to the location at which the logical inconsistency caused by the unsatisfied condition/predicate is detected. Such an assertion is helpful in detecting bugs in sequential programs, because the program code preceding the assertion can be reviewed to find the code that is responsible for triggering the assertion failure. However, for parallel programs, the location of the assertion is insufficient to pin-point a bug because the assertion only identifies errors in the thread in which the assertion was placed but does not identify other threads that may be responsible for causing the bug, also known as the root cause. At least one example bug detector disclosed herein uses predicates that operate in a manner similar to an assertion to reproduce and identify bugs in a multi-threaded program.

A block diagram of an example debugging tool (bug detector) 10 to detect a bug in an example multi-threaded program 11 is illustrated in FIG. 1. The example tool 10 of FIG. 1 includes an example controller 12 to control an example thread monitor 14, an example thread controller 16, an example timer 18, an example tester 20 and an example message generator 22. In some examples, the example multi-threaded program 11 includes a first thread, thread1, and a second thread, thread2, stored in a first memory 24, and each of thread1 and thread2 include a set of example program code statements. An example processor 26, having access to the first memory 24 executes the example multi-threaded program 11 and stores one or more of a set of variables shared by thread1 and thread2 of the example multi-threaded program in a second memory 27. In some examples, the first memory 24 and the example second memory 27 are the same memory.

In some examples, the example controller 12 causes the example thread monitor 14 to observe the execution of thread1 and thread2. When the execution of thread1 has progressed to a first program code statement at a predefined example first location, L1, the example thread monitor 14 notifies the example controller 12 which causes the example tester 20 to determine whether a first condition associated with a first predicate is present. In some examples, the condition is associated with a first variable stored in the example second memory 27 and the example tester 20 determines whether the first condition is present by accessing the example second memory 27 and determining whether the first stored variable is equal to a first predefined value. If the first stored variable is equal to the first predefined value, the example tester 20 notifies the example controller 12 that the first predicate is present ("satisfied"). When thread2 has progressed to a second program code statement at a predefined example second location, L2, the example thread monitor 14 notifies the example controller 12 which causes the example tester 20 to determine whether a second condition associated with a second predicate is satisfied. In some examples, the second condition is associated with a second variable stored in the example second memory 27 and the example tester 20 determines whether the second condition is satisfied by accessing the example second memory 27 and determining whether the second stored variable is equal to a second predefined value. If the second stored variable is equal to the second predefined value, the example tester 20 notifies the example controller 12 that the second predicate is satisfied. The example controller 12 then causes the example tester 20 to test for the presence of a predefined relationship ("predicate relationship") between the first predicate, P1, and the second predicate, P2. If the predicate relationship is present, the example controller 12 causes an example message generator 22 to generate and transmit an error message to an example output device 28 and then the multi-threaded program 11 crashes. The example output device 28 may be a visual display, a speaker, a printer or any other device capable of informing a user that the bug has been detected. In some examples, the predicate relationship specifies that both the first and the second predicates are to be concurrently satisfied.

In other examples, the first condition and the second condition are the same condition. In other examples, the first predicate can be associated with a first plurality of conditions and the example controller 12 causes the example tester 20 to test for all of the first conditions upon reaching the first location, L1. If all of the conditions are satisfied, then the example tester 20 notifies the example controller 12 that the first predicate, P1, has been satisfied. Likewise, the second predicate, P2, can be associated with a plurality of example second conditions and the example tester 20 tests for all of the second conditions upon reaching the example second predefined location, L2. If all of the second conditions are satisfied, the example controller 12 causes the example tester 20 to test for the presence of the predicate relationship between the first predicate, P1, and the second predicate, P2. In other examples, the predicate relationship can also/instead specify that the first predicate, P1, and the second predicate, P2, be satisfied in a specific order (e.g., that P1 be satisfied before P2 or vice versa). In still other examples, the predicate relationship can specify that either P1 or P2 be satisfied. Other example predicate relationships are disclosed below.

The first location, L1, in thread1 may represent a location contained in a portion of thread1 that may be at least partially responsible for causing the bug. The second location, L2, in thread2 may represent a location contained in a portion of the second thread that may be at least partially responsible for causing the bug. If the predicate relationship is satisfied, the portion of thread1 containing the first location, L1, and the portion of the second thread containing the second location, L2, are at least partially responsible for causing the bug.

In a debugging environment, the programmer may not know exactly which portions of thread1 and thread2 are responsible for causing a concurrency violation, (e.g., the programmer may not know where the bug is located). Thus, the programmer is assumed to have made an educated guess about where the locations, L1 and L2, are located and what conditions must be met for the concurrency violation to occur. Provided that the programmer's educated guess is accurate, the concurrency violation is reproduced (e.g., the bug occurs), and the programmer is able to identify the responsible, defective operations of thread1 and thread2. If the concurrency violation does not occur when thread1 and thread2 are executed with the bug detector in place, the programmer is able to identify the corresponding portions of thread1 and thread2 as not being responsible for the bug. The programmer may then make another educated guess about what other portions of thread1 and thread2 might be causing the concurrency violation. The programmer then reconfigures the bug detector 10 and identifies a new first location and a new second location at which the bug may occur in an attempt to reproduce the concurrency violation. This process of locating the portions of thread1 and thread2 responsible for the concurrency violation is sometimes referred to as a divide-and-conquer technique.

Upon isolating the defective operations of thread1 and thread2 responsible for the bug, the programmer may revise those operations in an attempt to remove the bug. The programmer may then use the bug detector 10 to determine whether the bug has been successfully removed. If the bug occurs again, then the programmer may further revise the defective thread operations. If the bug does not occur again, and provided that the example bug detector 10 has been properly configured, the programmer has a greater degree of confidence that the bug has been removed and/or repaired.

In some examples, the example controller 12 causes the example thread monitor 14 to monitor the forward progress of thread1. Upon observing that thread1 has reached the first location, L1, the example thread monitor 14 provides an indication to the example controller 12 which responds to the indication by causing the example tester 20 to test for the first condition. If the first condition is satisfied, the example thread monitor 14 indicates to the example controller 12 that the first condition has been satisfied and the example controller 12 causes the example thread controller 16 to control the forward progress of thread1 for a threshold amount of time. While the forward progress of thread1 is being controlled, the example controller 12 causes the example thread monitor 14 to begin monitoring thread2. Upon observing that the second thread has reached the second location, L2, the example thread monitor 14 provides an indication to the example controller 12 which responds to the indication by causing the example tester 20 to test for the second condition. If the second condition is satisfied, the example thread monitor 14 indicates to the example controller 12 that the second condition has been satisfied and the example controller 12 tests to determine whether a relationship between/among the first and second condition is satisfied. If satisfied, a bug is detected and the example controller 12 causes the example message generator 22 to output an error message. If the second condition is not satisfied within a threshold amount of time as measured by the example timer 18, the bug has not been detected and the bug detector 10 ceases operation. In some examples, the example thread controller 16 controls the forward progress of thread1 by stalling thread1 for the threshold amount of time.

By controlling the forward progress of thread1 relative to thread2, or vice versa, the example bug detector 10 controls the order in which the operations of thread1 are interleaved with the operations of thread2, (e.g., serializes the operations of thread1 relative to the operations of thread2). The example controlled interleaving of such operations is performed in a manner intended to increase the likelihood that the predicates are satisfied in the manner specified by the predicate relationship so that the bug, if present, is detected.

In some examples, the first predicate, P1, specifies a first condition relationship between the plurality of first conditions and/or the second predicate, P2, specifies a second condition relationship between the plurality of second conditions. In this example, P1 is not satisfied until the first conditions associated with P1 are satisfied in accordance with the first condition relationship specified by P1. Likewise, P2 is not satisfied until the second conditions associated with P2 are satisfied in accordance with the second condition relationship specified by P2. In some examples, the predicates include a plurality of predicates (e.g., P1, P2, P3 . . . Pn) and the predicate relationship specifies a manner in which all of or a subset of the plurality of predicates must be satisfied before the bug will be detected.

Figure 2:
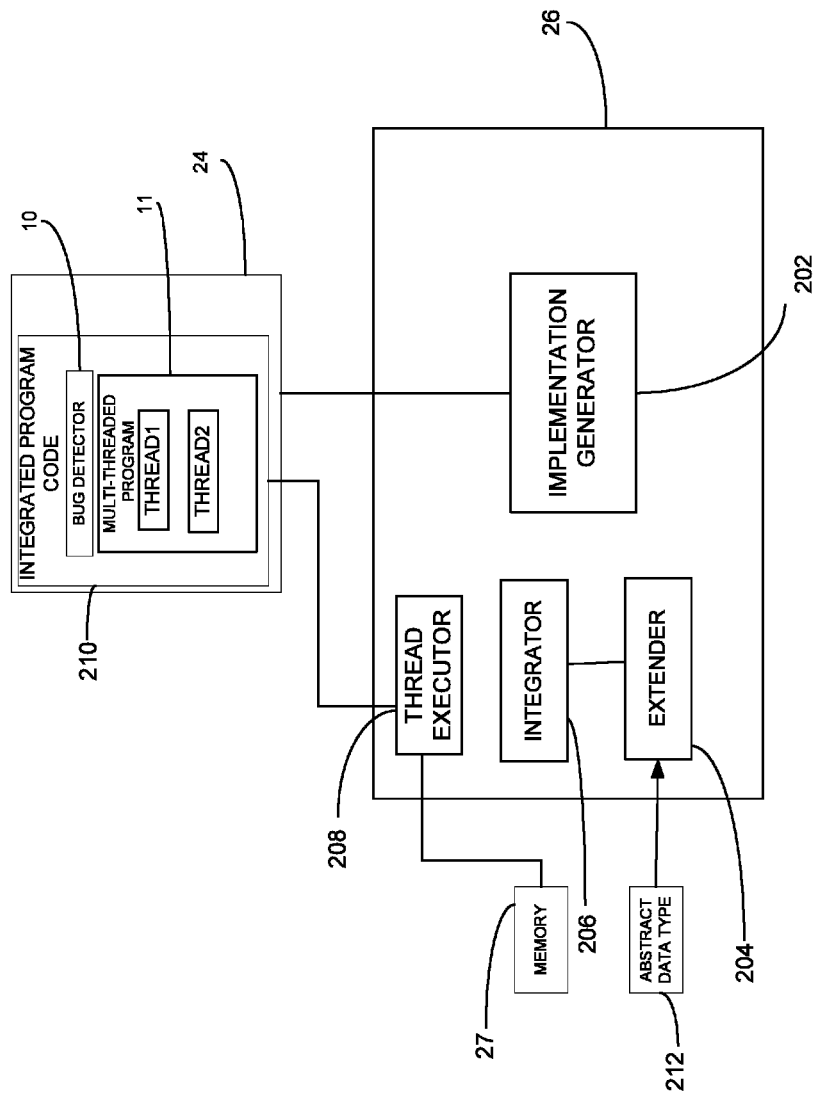
FIG. 2 is a block diagram of an example processor to automatically generate a software implementation of the bug detector of FIG. 1 in connection with the example multi-threaded program of FIG. 1.

In the illustrated example of FIG. 2, the example processor 26, includes an example implementation generator 202, an example extender tool 204, an example integrator 206, and an example thread executor 208. In some examples, the bug detector 10 is implemented in software. One or more parameters of the example bug detector 10 are specified in program code and/or program instructions conforming to a generalized format 212 referred to as an abstract data type 212. The parameters may be inserted (e.g., by the programmer) into the example multi-threaded program 11 for execution by the processor 26. Before executing the example multi-threaded program 11 having the parameters of the example bug detector 10 inserted therein, the example implementation generator 202 of the example processor 26 uses the parameters to generate a software implementation of the bug detector 10. In some examples, the generalized format 212 in which the bug parameters are specified is first provided to the example extender tool 204 for use in extending the grammar of the processor 26. Extending the grammar of the example processor 26 enables recognition and processing by the example processor 26 of any bug detector 10 conforming to the generalized format 212. The example implementation generator 202 of the example processor 26 uses the extended grammar to generate a software implementation of the example bug detector 10 using the parameters supplied in the generalized format 212. The example integrator 206 integrates the software implementation of the example bug detector 10 with the example multi-threaded program 11 to form an integrated set of program code ("integrated program code") 210. The example integrated program code 210 is then executed by the example thread executor 208 of the processor 26 and the bug, if present, is detected. In this example, the bug detector 10 is implemented by processor 26 performing the operations of the integrated program code 210. In some examples, one or more of the implementation generator 202, the extender tool 204, the integrator 206 and/or the thread executor 208 are implemented using a computer program compiler. In this example, the bug detector 10 is implemented by processor 26 performing the operations of the integrated program code 210.

A data type 212, represented as pseudocode, is illustrated FIG. 3A and defines one example generalized format (e.g., an abstract data type 212) for specifying the parameters of the bug detector 10 of FIG. 2. In this example, the parameters of the bug detector 10 are specified using a computer programming construct referred to as a concurrent predicate expression ("CPE") 300. The example abstract data type 212 of the example CPE 300 specifies a format for globally defining the CPE 300 within the example multi-threaded program 11. The global definition of the example CPE 300 is formatted to include a name of the bug to be detected and an error message to be output in the event that the bug is detected, as reflected in line CPE1 of the pseudocode of FIG. 3A. In addition, the global definition of the example CPE 300 is formatted to include declarations identifying: 1) two or more variables (line CPE2), 2) two or more predicates (line CPE3), and 3) a predicate relationship to be satisfied before the bug will be detected (line CPE4 and CPE5).

To use a bug detector conforming to the example abstract data type 212 (see FIG. 2), the example CPE 300 is globally defined within the example multi-threaded program 11 as described above, and then program code invoking the first predicate, P1, is inserted into thread1 of the example multi-threaded program at L1 and program code invoking P2 is inserted into thread2 of the example multi-threaded program at L2. In some examples, the program code invoking the predicates P1 and P2 operate in a manner similar to an assertion in that if the conditions associated with a given predicate are satisfied when the related program code is invoked, the predicate returns true. Otherwise the predicate returns false. As is further described below, the parameters (i.e., the predicates, the conditions associated with each predicate and the predicate relationship) of any given bug detector (e.g., the bug detector 10 of FIG. 1) are defined as needed to detect a specific bug within the context of a specific multi-threaded program 11. Likewise, the locations, L1 and L2, at which the predicates, P1 and P2, are invoked in thread1 and thread2, respectively, are specific to the bug to be detected and to the manner in which the threads operate within the context of the example multi-threaded program 11, as is also further described below.

When globally defining the example CPE 300 within the example multi-threaded program 11, the predicates, P1, P2 . . . Pk, are declared as being associated within one or more undefined conditions. The undefined condition(s) associated with any given predicate is then defined with specificity in the program code that invokes the associated predicate. In operation, the example multi-threaded program 11 having the global definition of the CPE and the predicate-invoking program codes inserted therein is supplied to the processor 26. The implementation generator 202 of the processor 26 uses the example globally defined CPE 300 and the predicate-invoking program codes to automatically generate a software implementation of the CPE 300. The integrator 206 of the processor 26 integrates the software implementation of the example CPE 300 with the example multi-threaded program 11 to form the integrated program code 210 which is then executed by the thread executor 208 of the processor 26.

As described above, when the example integrated program code 210 is executed, thread1 is executed and P1 is invoked upon reaching L1, and thread2 is executed and P2 is invoked upon reaching L2. If both P1 and P2 are satisfied in the manner specified by the predicate relationship during execution of the example integrated program code 210, the example multi-threaded program 11 crashes and the error message is generated.

In some examples, the conditions associated with the predicates are based on the declared variables defined at line CPE2 and can be based on any program variables that are accessible to the programmer at the locations, L1 and L2. Further, any variables specified in the global definition of the CPE may be modified and used only by the predicates in which they are specified.

In some examples, each predicate can only be invoked in a single thread of the example multi-threaded program 11. In this example, any predicate invoked in a first thread can be renamed and a renamed version of the same predicate can be invoked in a different thread of the example multi-threaded program 11. In other examples, two differently named predicates can specify that the same conditions be satisfied in accordance with the same condition relationship. In still other examples, a STALL (t) condition is defined to allow the execution of a predicate to be delayed for an amount of time that is proportional to the value of "t." Accordingly, a predicate containing the STALL(t) condition will not return true until the specified amount of time, "t," has elapsed (and provided that any other conditions specified in the predicate are satisfied in accordance with the condition relationship specified by the predicate). In other examples, more than one predicate can be invoked in a single thread of a multi-threaded program 11.

In the illustrated example of FIG. 3B, a set of predicate relationships 302, hereinafter referred to as expressions, "e," are specified in the global definition of the CPE 300 of FIG. 3A. As shown in FIG. 3B, a first example expression, e1, is represented as (P1>&P2) and specifies that thread1 be monitored to determine whether P1 is satisfied. If P1 is satisfied, the example the example controller 12 causes the example thread controller 16 to stall thread 1. While thread1 is stalled, the example controller 12 causes the example thread monitor 14 to begin monitoring thread2 to determine whether P2 is satisfied. Thus, for the example expression, e1, the example thread monitor 14 does not monitor thread2 or test for P2 until the first predicate, P1, has been satisfied. A second example expression, e2, is represented as (P1&&P2) and specifies that 1) P1 be satisfied and thread1 then be stalled until P2 is satisfied, or 2) P2 be satisfied and thread2 then be stalled until P1 is satisfied. In example expressing e1 and e2 of FIG. 3B, the stalled thread only remains stalled for a time "t." If the relevant predicate is not satisfied within the duration of time, "t," the bug has not been detected and the example controller 12 causes the example bug detector 10 to cease operating. The value of "t" can be set to any desired value (e.g., as determined by the programmer) and supplied with the example abstract data type to the extender tool 204 of the processor 26. A third example expression of FIG. 3B, e3, is represented as (P1∥P2) and specifies that either P1 or P2 be satisfied. A fourth example expression OF FIG. 3B, e4, is represented as (P1>P2) and specifies that P1 be satisfied before P2 is satisfied. A fifth example expression of FIG. 3B, e5, is represented as (P^n) and specifies that a predicate P be concurrently satisfied in a threshold number of threads, "n." In the fifth example expression of FIG. 3B, e5, when P is satisfied in any of the monitored threads, that thread is stalled for the time, "t," to give the other threads time to satisfy P. If P is not concurrently satisfied "n" times within the stall time, "t," the bug has not been detected and the example controller 12 causes the example bug detector 10 to cease operating. Again, the stall time of the threads having a satisfied predicate can be set to any desired value (e.g., by the programmer) and supplied with the abstract type to the example extender tool 204. A sixth example expression of FIG. 3B, e6, represented as (P#n), specifies that a predicate P be satisfied "n" times without requiring that P be satisfied concurrently. Although the example expressions of FIG. 3B are described as illustrating predicate relationships, the expressions can also be used to represent condition relationships by replacing P1 with C1, P2 with C2, etc.

Figure 4:
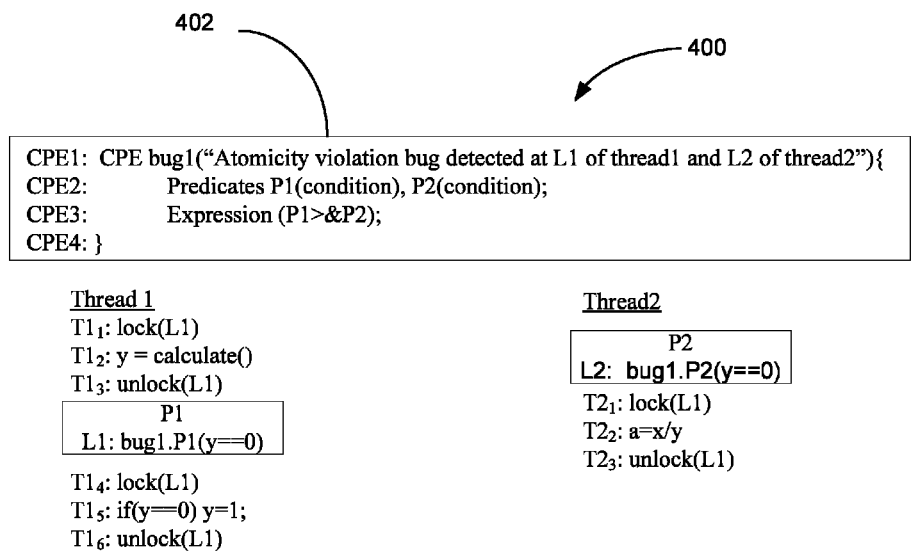
FIG. 4 illustrates example operations, represented in pseudocode, performed by a bug detector conforming to the example data type of FIG. 3A in the context of a first multi-threaded program.

In the illustrated example of FIG. 4, a set of operations 400 is described using pseudocode. The set of operations 400 is performed by an example thread1 and an example thread2 and have a CPE 402 incorporated therein. The operations 400 performed by thread1 and thread2 without the CPE 402 are first described followed by a description of the operations performed by the CPE 402 within the example multi-threaded program 11. In this example, the execution of thread1 and thread2 may cause a concurrency violation resulting from a divide by zero exception. The exception occurs when thread2 executes a divide instruction using a divisor, y, that is equal to zero. The divisor, y, may be stored as a variable in a shared memory location. Thread1 also operates on the variable, y, and can cause the variable, y, to equal zero. If thread1 detects that the variable, y, stored in the shared memory is zero, then thread1 replaces the zero with a non-zero value. In this example, the divide by zero exception will occur only when the variable, y, stored in the shared memory equals zero and thread2 performs the divide operation before thread1 has reset the shared memory to a non-zero value. Thus, a concurrency violation will be reproduced when the operations of thread1 and thread2 are serialized in a manner that causes thread2 to perform the divide operation when the divisor, y, stored in the shared memory is zero.

Referring still to the illustrated example of FIG. 4, thread1 begins, as reflected by lines $T1_1$-$T1_3$ of the pseudocode, by obtaining a lock to prevent thread2 from accessing the shared memory where y is stored. Upon obtaining the lock, thread1 calculates the value of y. In this example, the specific calculation performed to obtain y is not relevant. It matters only that the calculation may cause the value of y to equal zero. After the calculation of y, the lock is released such that either of thread1 or thread2 may access the shared memory in which y is stored. As reflected in lines $T1_4$-$T1_6$ of FIG. 4, thread1 then obtains the lock a second time and checks to determine whether the value of y equals zero. If so, thread1 resets the value of y to equal one to avoid the divide by zero exception that might otherwise occur if thread2 were to perform a divide operation using a divisor of zero. Thread1 then releases the lock.

Example thread2 begins, as reflected in line $T2_1$ of FIG. 4, by obtaining the lock to prevent thread1 from accessing the shared memory where y is stored. Thread2 then performs the divide operation using y as a divisor and releases the lock (lines $T2_2$-$T2_3$). During many iterations of the example multi-threaded program 11, when thread1 calculates a value of y that is equal to zero, thread1 will reset the value of y to one before thread2 performs the divide operation. However, there may be instances in which thread1 calculates a value of y equal to zero and then both thread1 and thread2 reach for the lock at the same time. If thread2 obtains the lock before thread1 and thus, before thread1 has reset y to a non-zero value, then the divide by zero exception may occur.

Referring still to the illustrated example of FIG. 4, as described above, the bug detector 10 incorporated into the example multi-threaded program 11 is implemented using a CPE 402 and detects the divide by zero exception. The example CPE 402 is globally defined within the context of the example multi-threaded program 11 in the manner shown in the pseudocode represented in lines CPE1-CPE4 of FIG. 4. Here, at line CPE1, the CPE 402 names the bug to be detected, "bug1," and includes an error message stating "Atomicity violation bug detected at L1 of thread1 and L2 of thread2". At line CPE2 of FIG. 4, the first predicate, P1(condition), and the second predicate, P2(condition), are declared and at line CPE3-CPE4, the expression (P1>&P2) is declared. The program code invoking P1 is represented by the pseudocode bug1.P1(y==0) and is inserted into thread1 at the first location, L1, and the program code invoking P2 is represented by the pseudocode bug1.P2(y==0) and is inserted into thread2 at the second location, L2. In operation, thread1 executes in the same manner as described above until the example thread monitor 14 observes that L1 is reached, at which time P1 is invoked. The example thread monitor 14 notifies the example controller 12 that the first predicate, P1, has been invoked and the example controller 12 causes the example tester 20 to determine whether the condition (y=0) is satisfied. When the condition (y=0) has been satisfied, P1 is satisfied and the example controller 12 causes the example thread controller 16 to stall thread1 for a threshold amount of time as measured by the output of the example timer 18. In this example, the example controller 12 causes the example thread controller 16 to stall thread1 in accordance with the expression declared in the CPE 402 (i.e., P1>&P2). When thread1 is stalled, the example thread monitor 14 observes the execution of thread2. When L2 is reached, P2 is invoked. In this example, the program code invoking P2 at L2 is reached before the operations at lines $T2_1$-$T2_3$ are performed. The example thread monitor 14 notifies the example controller 12 that P2 has been invoked and the example controller 12 causes the example tester 20 to determine whether the condition associated with P2 (i.e., y=0) is satisfied. If the condition y=0 has been satisfied, P2 is satisfied, and the example tester 20 notifies the example controller 12 that P2 has been satisfied. In this example, provided that the first and second predicates, P1 and P2, respectively, have been satisfied in conformance with the expression (P1>&P2), the atomicity violation is reproduced and the example controller 12 causes the example message generator 22 to generate the message, "Atomicity violation bug detected at L1 of thread1 and L2 of thread2."

In the illustrated example of FIG. 5, a set of operations 500 is described using pseudocode. The set of operations 500 is performed by thread1 and thread2 and have a CPE 502 incorporated therein. The example operations performed by thread1 and thread2 without the CPE 502 are first described followed by a description of the operations performed by the CPE 502 within the example multi-threaded program 11. In this example, thread1 is an infinite loop and obtains a lock on a container (e.g., a data storage structure), sets a variable "id" equal to a randomly generated number, places "id" into the container, and releases the lock (lines $T1_1$-$T1_6$). The container contains a number of elements including an element stored at an end location of the container. An element stored at the end location of the container is the last and only remaining element contained in the container. Thread1 then obtains the lock on the container, outputs the element stored at the end location of the container causing the container to be empty, and releases the lock (lines $T1_7$-$T1_{10}$).

Example thread2 is an infinite loop that causes the processor 26 to obtain the lock on the container, set the variable "id" equal to a randomly generated number, erase or remove the element, "id," from the container, and release the lock (lines $T2_1$-$T2_6$). However, the portion of thread1 represented by lines $T1_7$-$T1_{10}$ does not perform a validity check on the iterator or pointer after thread2 has executed and before thread1 proceeds to access the container location referenced by the pointer. Instead, thread1 is designed to operate as though an element is stored at the location referenced by the pointer because thread1 placed the element into that location at the lines $T2_1$-$T2_6$ (before thread2 executed). However, thread2, as described above, may have removed the element inserted into that location by thread1. Thus, after the execution of thread2, the iterator or pointer may point to a location in the container that no longer contains the element. When thread1 then attempts to access the element contained at the location referenced by the pointer (see line $T1_7$), thread1 will find the location empty and the program crashes.

Referring still to the illustrated example of FIG. 5, as described above, the bug detector incorporated into the example multi-threaded program 11 is implemented as the CPE 502 and is designed to detect any attempt to access the element "id" after it has been removed from the container causing the container to be empty. The CPE 502 is globally defined within the context of the example multi-threaded program 11 in the manner shown in the pseudocode represented in lines CPE1-CPE5. The bug to be detected is named, "bug2," and the error message "Attempt To Access A Removed Element Due to Atomicity Violation at L1 of thread1 and at L2 of thread2" is specified at line CPE1. At line CPE2, a local variable, "removed_id" is declared to be invalid. At line CPE3, a first predicate, P1(condition), and a second predicate, P2(condition) are declared, and at line CPE4-CPE5 an expression (P2>&P1) is declared. As shown in the pseudocode of FIG. 5, program code invoking P1 and program code invoking P2 is inserted at L1 of thread1 and L2 of thread2, respectively. In operation, thread1 executes in the same manner described above until the example thread monitor 14 observes that line L1 is reached at which time P1 is invoked. Likewise, thread2 executes in the same manner described above until the example thread monitor 14 observes that line L2 is reached at which time P2 is invoked.

In this example, P2 is invoked after thread2 has removed the element, "id," from the container (line $T2_4$) and after thread2 has released access control over the container (line $T2_5$). P2, when invoked, causes the example controller 12 to set the local variable "removed_id" equal to "id" to indicate that the element "id" has been removed from the container. In this example, P2 specifies an operation to be performed such that P2 is satisfied when the operation is completed. After the operation specified in P2 is performed, the example controller 12 stalls the execution of thread2 and begins monitoring thread1 to determine whether P1 has been satisfied as specified by the expression (P2>&P1).

In the illustrated example of FIG. 5, P1 is invoked after thread1 has inserted the element, "id," into the container (line $T1_4$) but before thread1 has attempted to output the element stored in the end location of the container (line $T1_7$). In this example, when P1 is invoked, the example controller 12 causes the example thread controller 16 to stall thread1 for a count of 5, after thread1 has stalled for a count of 5, the example controller 12 causes the example tester 20 to determine whether P1 is satisfied. Here, P1 is designed to be satisfied when the element "id" is located at the end location of the container and thread2 has previously removed "id" from the container, causing the container to be empty. Thus, if P1 is satisfied after P2 has been satisfied, thread1 and thread2 have progressed in a manner that will cause the crash to occur as described above. Accordingly, the example controller 12 causes the example message generator 22 to output the message, "Attempt to Access a Removed Element Due to Atomicity Violation at L1 of thread1 and L2 of thread2."

In the illustrated example of FIG. 6 an example set of operations 600 is described using pseudocode. The set of operations 600 is performed by an example thread1 and an example thread2 and have an example CPE 602 incorporated therein. The operations performed by thread1 and thread2 without the CPE 602 are first described followed by a description of the operations performed by the CPE 602 within the example multi-threaded program 11. In this example, thread1 is a while loop ($T1_2$-$T1_{17}$) that continues to loop while the value of a variable "count" is greater than or equal to zero (line $T1_2$). Next a program object, pthread_mutex_t, is defined at line $T1_4$ to allow thread1 and thread2 to share two locks, lock_one and lock_two, provided that thread1 and thread2 do not use lock_one and lock_two simultaneously. After the object "pthread_mutex_t," is defined, thread1 tests to determine whether the modulo of a randomly generated variable is equal to zero such that the statement at line $T1_5$ returns true. If the statement at line $T1_5$ returns true, then thread1 sets lock_one equal to B and sets lock_two equal to A (line $T1_7$). If the statement at line $T1_5$ returns false, thread1 sets lock_one equal to A and sets lock_two equal to B (line $T1_{11}$). Thread1 then places a lock on lock_one (line $T1_{13}$). Next, an element stored in a container is output (line $T1_{14}$). Here, the nature of the element output is not relevant to the operation of the CPE 602 within the multi-threaded lock and is not described further herein. Thread1 then places a lock on lock_two (line $T1_{15}$), after which thread1 proceeds to unlock lock_one and unlock lock_two (line $T1_{16}$). Thus, in operation, thread1 acquires a lock on the variable B before acquiring a lock on the variable A if the statement "rand( ) % 100==zero" ("the rand statement") at line $T1_5$ returns true. Conversely, thread1 acquires a lock on the variable A before acquiring a lock on the variable B if the rand statement at line $T1_5$ returns false.

In this example, thread2 performs the same operations as thread1 (compare the statements at lines $T1_1$-$T1_{17}$ to statements $T2_1$-$T2_{17}$). Thus, thread2 acquires a lock on the variable B before acquiring a lock on the variable A if the rand statement at line $T2_5$ returns true. Conversely, thread2 acquires a lock on the variable A before acquiring a lock on the variable B if the rand statement at line $T2_5$ returns false.

When both thread1 and thread2 have acquired lock_one, the other of the threads will be prevented from accessing the locked variable until the lock-possessing thread releases the lock. Thus, if the statements at lines $T1_5$ and $T2_5$ have evaluated to true in each of the threads (i.e., both threads have set lock_one equal to the variable B), then whichever thread acquires lock_one first will proceed to execute the statements at lines $T1_{14}$-$T1_{17}$ or lines $T2_{14}$-$T2_{17}$ (depending on which thread acquires lock_one first) and the other thread will be unable to proceed until the lock-possessing thread has released lock_one at the statement $T1_{16}$ or $T2_{16}$ (depending, again, on which thread acquired lock_one first). Upon release of the lock on the variable B by the lock-possessing thread, the halted thread will again be able to operate and, having also set lock_one equal to the variable B, will acquire the lock on the variable B.

Likewise, if the statements at lines $T1_5$ and $T2_5$ have evaluated to false in each of the threads (i.e., both threads have set lock_one equal to the variable A), then whichever thread acquires lock_one first will proceed to execute the statements at lines $T1_{14}$-$T1_{17}$ or lines $T2_{14}$-$T2_{17}$ (depending on which thread acquires lock_one first) and the other thread will be unable to proceed until the lock-possessing thread has released lock_one at the statement $T1_{16}$ or $T2_{16}$ (depending, again, on which thread acquired lock_one first). Upon release of the lock on the variable A by the lock-possessing thread, the halted thread will again be able to operate and, having also set lock_one equal to the variable A, will acquire the lock on the variable A.

If, instead, the rand statements at line $T1_5$ and line $T2_5$ do not both return true, or the rand statements at line $T1_5$ and line $T2_5$ do not both return false and provided that both threads have obtained lock_one (at lines $T1_{13}$ or $T2_{13}$) before either thread reaches for lock_2 (at lines $T1_{15}$ or $T2_{15}$), then a deadlock will occur as described below. Consider the example in which the rand statement at line $T1_5$ in thread1 evaluates to false and the rand statement at line $T2_5$ in thread2 evaluates to true. Here, thread1 sets lock_one equal to A and thread2 sets lock_one equal to B. When thread1 acquires the lock on lock_one at line $T1_{13}$, the variable A is locked to prevent access by thread2. When thread2 acquires the lock on lock_one at line $T2_{13}$, the variable B is locked to prevent access by thread1. Thread1 then proceeds to attempt to acquire a lock on lock_two at line $T1_{15}$, which, in this instance has been set equal to B by thread1. Given that the variable B has been locked by thread2 at the line $T2_{13}$, thread1 halts until the lock on variable B has been released. Likewise, thread2 proceeds to attempt to acquire a lock on lock_two at line $T2_{15}$ which has been set equal to A by thread2. However, thread2 is unable to proceed because thread1 has locked the variable A at line $T1_{13}$. Thus, neither of thread1 nor thread2 is able to proceed and the example multi-threaded program 11 becomes deadlocked.

Thus, due to the shared locks, lock_one and lock_two, when the rand statements in thread1 and thread2 both return true or both return false, the threads will obtain the locks on the variables A and B in the same order and the example multi-threaded program will operate properly. If the rand statements evaluate differently in thread1 and thread2 and provided that both threads have obtained lock_one (at lines $T1_{13}$ or $T2_{13}$) before either thread reaches for lock_2 (at lines $T1_{15}$ or $T2_{15}$) then the threads will attempt to acquire the locks on the variables A and B in an order and the program will be deadlocked as described above.

There are at least four examples in which thread1 and thread2 may acquire the locks on the variables A and B in an order that will cause a deadlock including, 1) when thread2 acquires a lock on A first and thread1 acquires a lock on B first; 2) when thread1 acquires a lock on A first and thread2 acquires a lock on B first, 3) when thread2 acquires a lock on B first and thread1 acquires a lock on A first; and 4) when thread1 acquires a lock on B first and thread2 acquires a lock on A first. In order to cause a deadlock in each of the examples 1)-4), both threads must have obtained lock_one before either thread has reached for lock_two.

Referring still to FIG. 6, as described above, the CPE 602 is designed to detect the deadlock violation. In this example, the CPE 602 is globally defined within the context of the example multi-threaded program 11 in the manner shown in the pseudocode represented at lines CPE1-CPE4. Here, the CPE 602 names the bug to be detected, "bug3," and includes an error message stating "Dead Lock Due to Inconsistent Lock Acquire Ordering" at line CPE1. At line CPE2, a set of predicates including a first predicate, P11(condition), a second predicate, P12(condition), a third predicate, P21(condition) and a fourth predicate P22(condition) are declared. At line CPE3, the expression (P11 && P22||P21 && P12) is declared. As shown, the program code invoking P11, represented by the pseudocode bug3.P11(lock_one==B), is inserted into thread1 at L1, and the program code invoking P12, represented by the pseudocode bug3.P12 (lock_one==A) is inserted into thread1 at L1. As is also shown, program code invoking P21, represented by the pseudocode bug3.P21(lock_one==B), is inserted into thread2 at L2 and program code invoking P22, represented by the pseudocode bug3.P22 (lock_one==A) is inserted into thread2 at L2.

In operation, thread1 executes in the same manner described above until the example thread monitor 14 observes L1 is reached at which time P11 and then P12 are invoked. Likewise, thread2 executes in the same manner described with respect to above until the example thread monitor 14 observes that L2 is reached at which time P21 and then P22 are invoked. In this example, P11 and P12 are invoked after thread1 has acquired the lock on lock_one. P11 when invoked, causes the example controller 12 to determine whether lock_one is equal to the variable B and P12, when invoked, causes the example controller 12 to determine whether lock_one is equal to the variable A. If either predicate P11 or P12 is satisfied, the example tester 20 identifies the satisfied predicate to the example controller 12. P21, when invoked, causes the example controller 12 to determine whether lock_one is equal to the variable B and P22, when invoked, causes the example controller 12 to determine whether lock_one is equal to the variable A. If either predicate P21 or P22 is satisfied, the example tester 20 identifies the satisfied predicate to the example controller 12. After P11 or P22 is satisfied, thread1 is stalled in accordance with the expression declared in the CPE and after P12 or P21 is satisfied, thread2 is also stalled in accordance with the expression declared in the CPE. Stalling the threads in this manner prevents either thread from reaching for lock_two when one thread has locked A upon obtaining lock_one and the other thread has locked B upon obtaining lock_one.

As described above, there are, at least, four examples in which thread1 and thread2 may deadlock by acquiring the locks A and B in different order including, 1) when thread2 acquires A first and thread1 acquires B first, (i.e., when (P11>&P22) is satisfied); 2) when thread1 acquires A first and thread2 acquires B first, (i.e., when (P21>&P12) is satisfied, 3) when thread2 acquires B first and thread1 acquires A first, (i.e., when (P22>&P11) is satisfied; 4) when thread1 acquires B first and thread2 acquires A first (i.e., when (P12>&P21) is satisfied. Thus, the deadlock bug is reproduced/detected when the predicates, P11, P12, P21 and P22 satisfy the expression (P11 && P22||P21 && P12). As described above, the expression is formulated to ensure that the deadlock will only be detected/reproduced when both threads have obtained lock_one in a manner that causes one thread to lock the variable A and the other thread to lock the variable B and provided that neither thread has yet obtained lock_two.

In some examples, an alternative expression (P11>& P22||P21>& P12) may be substituted for the original expression (P11 && P22||P21 && P12). This alternative expression, when used, will fail to identify bugs occurring when the expressions (P22>&P21) and (P12>&P21) are satisfied. However, using this alternative expression will allow the bug detector to operate faster because the alternative expression is likely to occur sooner and with fewer stalls. The alternative expression is likely to occur sooner than the original expression because P11 and P21 are satisfied when the rand statement evaluates to true which is likely to occur sooner than P12 and P22 which are satisfied when the rand statement evaluates to false. Thus, the alternative relationship can be used when it is desirable to sacrifice accuracy in favor of speed.

In the illustrated example of FIG. 7 an example set of operations 700 is described using pseudocode. The set of operations 700 is performed by an example thread1 and an example thread2 and have a CPE 702 inserted therein. The CPE 702 is designed to detect a divide by zero exception. The operations performed by thread1 and thread2 without the CPE 702 are first described followed by a description of the operations performed by the CPE 702 within the example multi-threaded program 11. In this example, thread1 is an infinite loop (lines $T1_1$-$T1_{10}$). Upon entering the loop, a lock is obtained on a container at line $T1_3$ to restrict thread2 from accessing the container and a test is performed to determine whether an output of a random number generator is a non-zero value at line $T1_4$. If the output of the random number generator is not equal to zero, one or more operations are performed at line $T1_6$. In this example, the operations performed at line $T1_6$ are not specified because they do not affect the manner in which the bug is reproduced and are therefore not relevant to the operation of the CPE 702. If the output of the random number generator is equal to zero at the line $T1_4$, an element is removed from a container at line $T1_8$. thread1 then releases the lock on the container at line $T1_9$.

In this example, thread2 is an infinite loop (lines $T2_1$-$T2_{11}$). Upon entering the loop, thread2 locks the container at line $T2_3$ to restrict thread1 from accessing the container and sets a variable "total" equal to zero at a line $T2_4$. Next, thread2 assigns a pointer, "i," to point to a first element in the container. Provided that the pointer "i" is not pointing to a last element in the container, the value of "i" is incremented by one to point to a next element in the container at lines $T2_5$. Thread2 then adds the $i^{th}$ container element to the value of the variable "total" at line $T2_7$ and releases the lock on the container at line $T2_9$. Finally, thread2 calculates a variable "ave" by dividing the value of "total" by the number of elements in the container at line $T2_{10}$.

In the example multi-threaded program 11 represented by thread1 and thread2 of FIG. 7, a divide by zero exception will occur if thread1 removes the only remaining element from the container at line $T1_8$ and unlocks the container at line $T1_9$ immediately before thread2 performs the divide operation when calculating the variable "ave" at line $T2_{10}$. By removing the only remaining element from the container, thread1 causes the number of container elements to equal zero causing the divisor of line $T2_{10}$ to equal zero and a divide by zero exception.

Referring still to the example of FIG. 7, as described above, the CPE 702 is designed to detect the divide by zero violation occurring in thread1. The CPE is globally defined within the context of the example multi-threaded program 11 in the manner shown in the pseudocode represented in lines CPE1 through CPE4. The CPE names the bug to be detected, "bug4," at line CPE1 and includes an error message "Divide By Zero Bug at L1 and L2" at line CPE1. The CPE 700 also declares a set of predicates including a first predicate, P1(condition), a second predicate, P2(condition), and a third predicate, P3(condition) at line CPE2 and declares an expression (P2>(P1>&P3)) at CPE3. As shown, program code invoking P1 is represented by the pseudocode bug4.P1(cont.size( )==0) and is inserted into thread1 at L1 and program code invoking P2 is represented by the pseudocode bug4.P2(total !=0) and is inserted into thread2 at L2. As is also shown, program code invoking P3 is represented by the pseudocode bug4.P3(STALL(5) && total !=0 && cont.size( )==0) and is inserted into thread2 at L3.

In operation, thread1 executes as described above until the example thread monitor 14 observes that L1 is reached at which time P1 is invoked. When P1 is invoked, the example controller 12 causes the example tester 20 to determine whether P1 has been satisfied, (i.e., whether the container is empty). Likewise, thread2 executes as described above until the example thread monitor 14 observes that line L2 is reached at which time P2 is invoked. When P2 is invoked, the example controller 12 causes the example tester 20 to ensure that the value of the variable "total" is not equal to zero. If the variable "total" is equal to zero, then the dividend of the "ave" calculation performed at the line $T2_{10}$ will be equal to zero such that the calculation of "ave" will not result in a divide by zero exception even though the container may be empty. After P2 is invoked, P3 is invoked in thread2. When P3 is invoked, the example controller 12 causes the example tester 20 to determine whether P3 has been satisfied. P3 is satisfied if the container becomes empty provided that "total" is a non zero value. The timing at which the conditions of P3 are satisfied is controlled by stalling thread2 according to the relationship specified by P3. When P1, P2 and P3 are all satisfied in accordance with the expression (P2>(P1>&P3)), the bug is detected/reproduced and the example controller 12 causes the example message generator 22 to output the error message. In this example, the bug can be detected solely through the use of P3, though using the predicates P1 and P2 helps to pin point where the undesired interleaving originated in thread1 and thread2 which is useful when repairing the bug.

Figure 8:
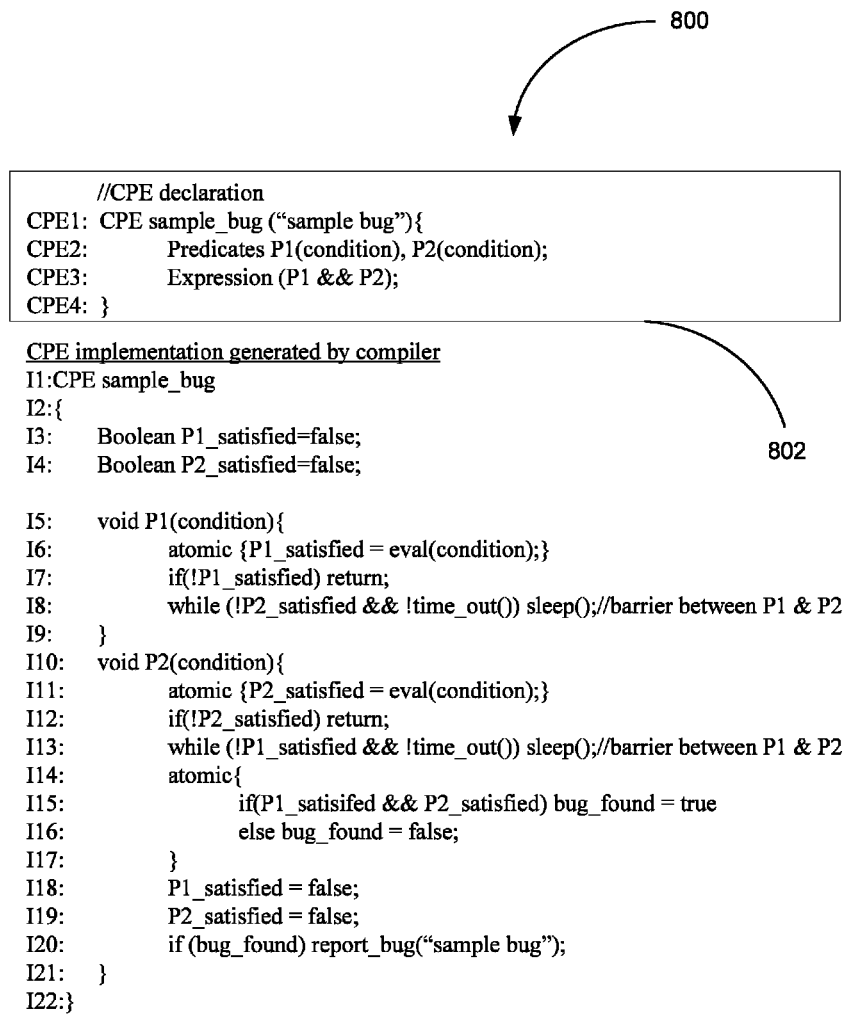
FIG. 8 illustrates example operations, represented in pseudocode, performed by a processor to execute a software implementation of a bug detector conforming to the example data type of FIG. 3A.

In the illustrated example of FIG. 8 an example set of operations 800 is described using pseudocode that represents an example software implementation of a CPE 802 designed to detect a "sample bug" associated with the example multi-threaded program 11. In this example, the software implementation is generated by the implementation generator 202 (see FIG. 2) and is then integrated with the example multi-threaded program 11 by the integrator 206 (see FIG. 2) to form the integrated program code 210 (see FIG. 2). The integrated program code 210 (see FIG. 2) is then executed by the thread executor 208 (see FIG. 2) of the processor 26 to detect the bug. Here, the CPE 802 to be generated is globally defined at the lines CPE1-CPE4 of the pseudocode. The example of FIG. 8 is intended to illustrate a generic software implementation of an example CPE 802 that evaluates the expression (P1 && P2). As described above, the expression (P1 && P2) is satisfied when either (P1>&P2) or (P2>&P1) is satisfied. In this example, the processor 26 defines P1 and P2 as not being satisfied at the lines I3 and I4. Next, the processor 26 performs a first set of operations at lines I5-I9 to determine whether (P1>&P2) is satisfied as further described below. The processor 26 then proceeds to perform the operations at lines I10-I13 to determine whether (P2>&P1) is satisfied as is also described further below. At lines I14-I17, the processor 26 indicates that the bug has been detected if either (P1>&P2) or (P2>&P1) are true and indicates that the bug has not been detected if neither (P1>&P2) nor (P2>&P1) are true. At lines I18-I20, the processor 26 performs a set of operations to reset the status of P1 and P2 to not satisfied at lines I18-I19 and to output the error message at line I20 if the processor 26 indicated that the bug was found at line I20.

When performing the operations at lines I5-I9, the processor 26 determines whether the condition P1 is satisfied. If P1 is not satisfied, then (P1>&P2) is not satisfied and the processor 26 proceeds to execute the operations at lines I10-I13. If P1 is satisfied, the processor 26 stalls thread1 and repeatedly tests to determine whether P2 is satisfied until either P2 is satisfied or until a threshold amount of time has elapsed at line I8. If P2 is satisfied before the threshold amount of time has elapsed, the portion of the expression (P1&&P2) represented as (P1>&P2) has been satisfied such that the processor 26 will indicate that the bug has been detected in connection with the operation performed at line I15 as described below. If P2 is not satisfied before the threshold amount of time has elapsed, then (P1&&P2) is not satisfied and the processor 26 performs the operations at I10-I13 to determine whether (P2>&P1) is satisfied.

When performing the operations at lines I10-I13, the processor 26 determines whether the condition P2 is satisfied. If P2 is not satisfied, the processor 26 executes the operations at lines I14-I17. If P2 is satisfied, the processor 26 stalls thread2 and repeatedly tests to determine whether P1 is satisfied until either P1 is satisfied or until a threshold amount of time has elapsed at line I13. If P1 is satisfied before the threshold amount of time has elapsed, the portion of the expression (P1&&P2) represented as (P2>&P1) has been satisfied such that the processor 26 will indicate that the bug has been detected in connection with the operation performed at line I15. If P1 is not satisfied by the processor 26 within the threshold amount of time, then (P2>&P1) is not satisfied and the processor 26 performs the operations at lines I14 through I17.

When performing the operations at lines I14-I17, the processor 26 determines whether either of (P1>&P2) or (P2>&P1) are satisfied based on the outcome of the operations performed at lines I5-I9 and at lines I10-I13. If either or both of (P1>&P2) or (P2>&P1) are satisfied, the expression (P1&&P2) has been satisfied and the processor 26 sets a variable "bug_found" to true at line I15 to indicate that the bug has been detected. If neither (P1>&P2) nor (P2>&P1) are satisfied, the processor 26 sets the variable "bug_found" to false at line I16 to indicate that the bug has been detected.

The processor 26 resets the status of both P1 and P2 to not satisfied at the lines I18 and I19 and the processor 26 either reports the bug as being found or not, depending on the outcome of the operations performed at lines I14 through I16.

In the illustrated example of FIG. 9, an example set of operations 900 is described using pseudocode that represents an example implementation of a CPE 902 designed to detect a "sample bug2" associated with the example multi-threaded program 11. In this example, the software implementation is generated by the implementation generator 202 (see FIG. 2) and is then integrated with the example multi-threaded program 11 by the integrator 206 (see FIG. 2) to form the integrated program code 210 (see FIG. 2). The integrated program code 210 (see FIG. 2) is then executed by the thread executor 208 (see FIG. 2) of the processor 26 to detect the bug. Here, the CPE 902 to be generated is globally defined at the lines CPE1-CPE4 of the pseudocode. The example of FIG. 9 is intended to illustrate a generic software implementation of an example CPE 902 that evaluates the expression (P0>(P1^2&P2^3)#3). Thus, the bug will be detected when P0 is satisfied in one thread before a combination of P1 and P2 are repeatedly satisfied three times. Here, the combination of P1 and P2 is satisfied when P1 has been concurrently satisfied in two threads and P2 has been concurrently satisfied in three threads. In this example, P1 is inserted into at least two or more threads, P2 is inserted into at least three threads and P0 is inserted into at least one thread.

As described above, the example of FIG. 9 is intended to illustrate a generic software implementation of an example CPE 902 that evaluates the expression (P0>(P1^2&P2^3)#3). As a result, the conditions associated with P0, P1 and P2, the locations at which P0, P1 and P2 are inserted in any given thread of the example multi-threaded program, and the specific operation of the example multi-threaded program 11 itself are not relevant to the manner in which the expression (P0>(P1^2&P2^3) #3) is evaluated by the CPE 902 and thus are not described herein.

At the lines I2-I5, the processor 26 sets the status of the predicate P0 to not satisfied, sets the number of times that each of P1 and P2 has been satisfied equal to zero and sets a variable, "num_repeats," to zero. Here, the variable "num_repeats" represents the number of times that the expression (P1^2&P2^3) has been satisfied.

At the lines I6-I8, the processor 26 determines whether P0 has been satisfied by evaluating whether the condition associated with P0 has been satisfied.

At the lines I9-I13, provided that P0 has been satisfied, the processor 26 increments the number of times P1 has been satisfied by one each time the condition associated with P1 has been satisfied. At the line I14, the processor 26 waits a threshold amount of time for either (P1^2>&P2^3) to be satisfied or for (P2^3>&P1^2) to be satisfied. Each time P1 is satisfied in any given thread, that thread is stalled to allow time for P1 to be concurrently satisfied in one or more other threads. Likewise, each time P2 is satisfied in any given thread, that thread is stalled to allow time for P2 to be concurrently satisfied in one or more other threads.

At the lines I16-I20, provided that P0 has been satisfied, the processor 26 increments the number of times P2 has been satisfied by one each time the condition associated with P2 has been satisfied. At the line I21, the processor 26 waits a threshold amount of time for either (P1^2>&P2^3) to be satisfied or for (P2^3>&P1^2) to be satisfied. Each time P1 is satisfied in any given thread, that thread is stalled to allow time for P1 to be concurrently satisfied in one or more other threads. Likewise, each time P2 is satisfied in any given thread, that thread is stalled to allow time for P2 to be concurrently satisfied in one or more other threads.

At the lines I22-I24, the processor 26 increments the variable "num_repeats" by one each time the expression (P1^2 && P2^3) is satisfied. At the lines I25-I26, the processor 26 resets the status of P1 and P2 to indicate that they are not satisfied. At the line I27-I29, provided that the variable "num_repeats" is equal to three (i.e., the expression (P1^2 && P2^3) has been repeatedly satisfied three times), the processor 26 sets the status of P0 to indicate P0 has not been satisfied and also reports the bug as being detected.

While examples of the bug detector 10 have been illustrated in FIGS. 1, 2, 3A, 3B, 4, 5, 6, 7, 8 and 9, one or more of the elements, processes and/or devices illustrated in FIGS. 1-9 may be combined, divided, re-arranged, omitted, eliminated and/or implemented in any other way. Further, any or all of the example bug detector 10, the example controller 12, the example thread monitor 14, the example thread controller 16, the example timer 18, the example tester 20, the example message generator 22, the example first and second memories 24 and 27, the example thread executor 208, the example processor 26, the example integrator 206, the example extender tool 204, the example CPEs 300, 402, 502, 602 and 702 and the example implementations of CPEs 802 and 902 of FIGS. 1, 2, 3A, 3B, 4, 5, 6, 7, 8 and 9 may be implemented by hardware, software, firmware and/or any combination of hardware, software and/or firmware. Thus, for example, any of the example bug detector 10, the example controller 12, the example thread monitor 14, the example thread controller 16, the example timer 18, the example tester 20, the example message generator 22, the example first and second memories 24 and 27, the example thread executor 208, the example processor 26, the example integrator 206, the example extender tool 204, the example CPEs 300, 402, 502, 602 and 702 and the example implementations of CPEs 802 and 902 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of this patent are read to cover a purely software and/or firmware implementation, at least one of the example bug detector 10, the example controller 12, the example thread monitor 14, the example thread controller 16, the example timer 18, the example tester 20, the example message generator 22, the example first and second memories 24 and 27, the example thread executor 208, the example processor 26, the example integrator 206, the example extender tool 204, and the example CPEs 300, 402, 502, 602 and 702 and the example implementations of CPEs 802 and 902 are hereby expressly defined to include a tangible computer readable medium such as a (memory, digital versatile disk (DVD), compact disk (CD), etc.), storing such software and/or firmware. Further still, the example bug detector 10, the example controller 12, the example thread monitor 14, the example thread controller 16, the example timer 18, the example tester 20, the example message generator 22, the example first and second memories 24 and 27, the example thread executor 208, the example processor 26, the example integrator 206, the example extender tool 204, and the example CPEs 300, 402, 502, 602 and 702 of FIGS. 1, 2, 3A, 3B, 4, 5, 6, and 7 and the example implementations of CPEs 802 and 902 of FIGS. 8 and 9 may include one or more elements, processes and/or devices in addition to, or instead of, those illustrated in FIGS. 1, 2, 3A, 3B, 4, 5, 6, 7,8 and 9 and/or may include more than one of any or all of the illustrated elements, processes and devices.

Figure 14:
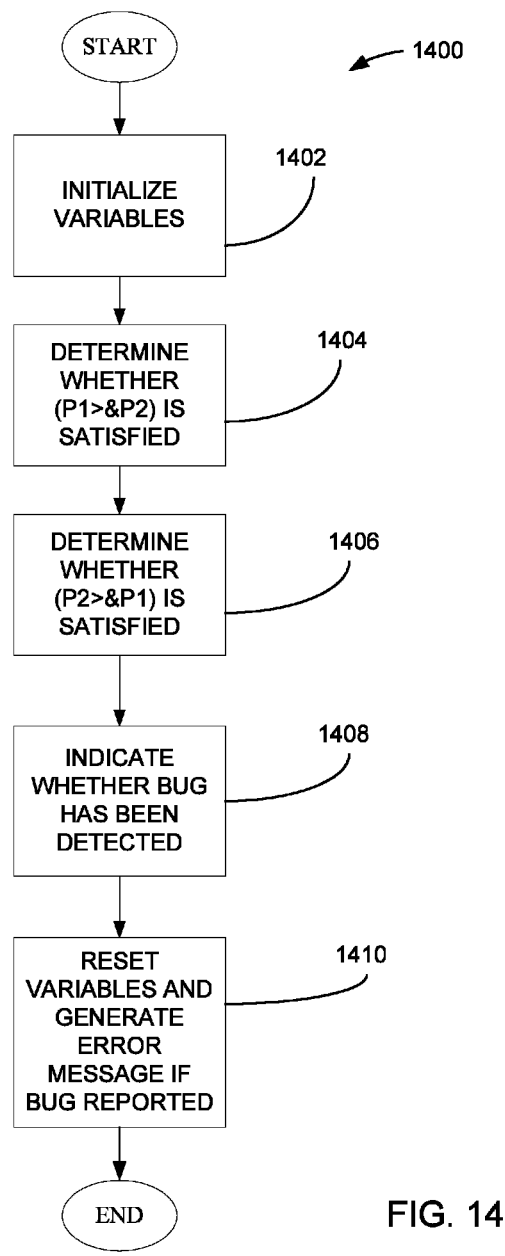
FIG. 14 is a flowchart representative of example machine readable instructions implementing a first generic bug detector.
Figure 15:
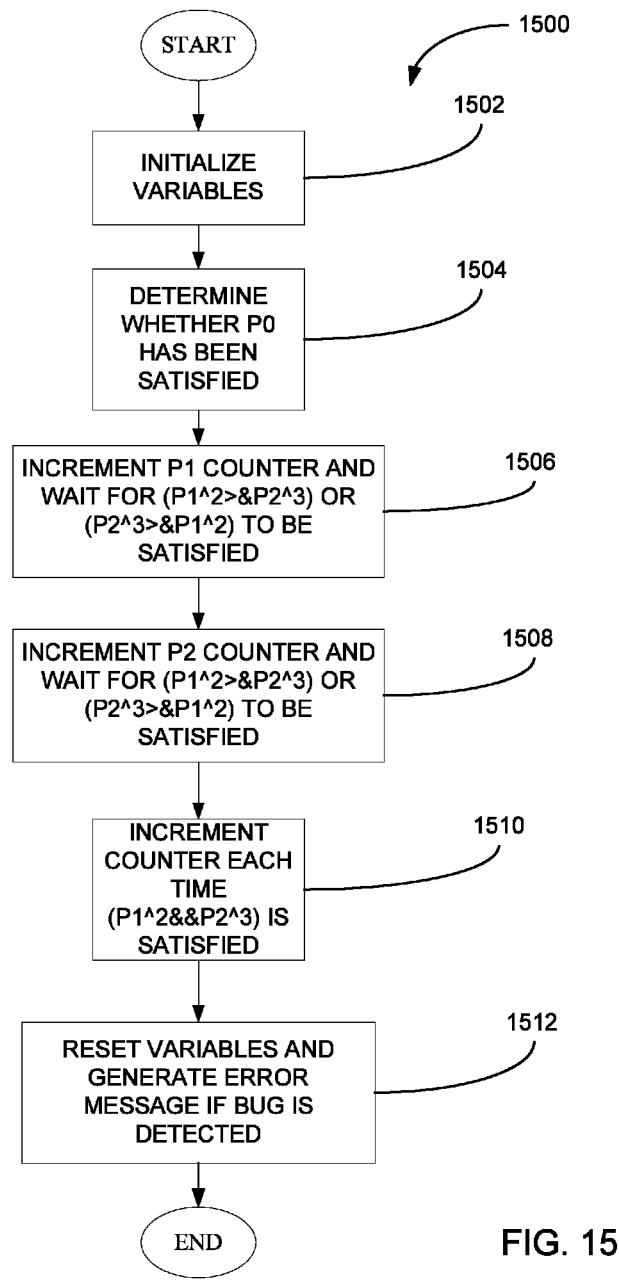
FIG. 15 is a flowchart representative of example machine readable instructions implementing a second generic bug detector.
Figure 16:
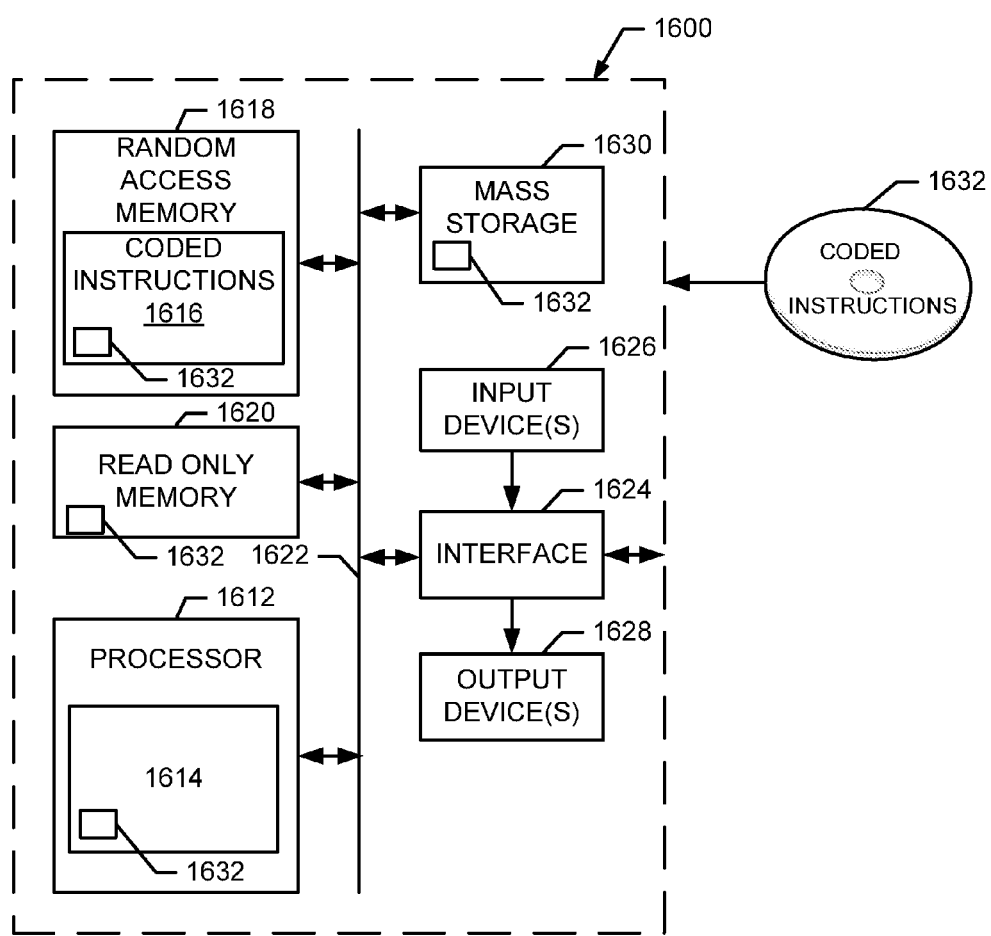
FIG. 16 is a block diagram of an example processing system that may execute the example machine readable instructions of FIGS. 10, 11, 12A-12F, 13, 14 and 15 to implement the example bug detectors of FIGS. 1, 2, 3A, 4, 5, 6, 7, 8 and 9.

Flowcharts representative of example machine readable instructions that may be executed to implement the bug detector 10 of FIGS. 1-7 and to process a CPE implementation of the bug detector of FIGS. 8 and 9 are shown in FIGS. 10, 11, 12A, 12B, 12C, 12D, 12E, 12F, 13, 14 and 15 In these examples, the machine readable instructions represented by each flowchart may comprise one or more programs for execution by a processor, such as the example processor 1612 shown in the example processing system 1600 discussed below in connection with FIG. 16. Alternatively, the entire program or programs and/or portions thereof implementing one or more of the processes represented by the flowcharts of FIGS. 8, 9, 10, 11, 12A, 12B, 12C, 12D, 12E, 12F, 13, 14 and 15 could be executed by a device other than the example processor 1612 (e.g., such as a controller and/or any other suitable device) and/or embodied in firmware or dedicated hardware (e.g., implemented by an ASIC, a PLD, an FPLD, discrete logic, etc.). Also, one or more of the blocks of the flowcharts of FIGS. 10, 11, 12A, 12B, 12C, 12D, 12E, 12F, 13, 14 and 15 may be implemented manually. Further, although the example machine readable instructions are described with reference to the flowcharts illustrated in FIGS. 10, 11, 12A, 12B, 12C, 12D, 12E, 12F, 13, 14 and 15 many other techniques for implementing the example methods and apparatus described herein may alternatively be used. For example, with reference to the flowcharts illustrated in FIGS. 10, 11, 12A, 12B, 12C, 12D, 12E, 12F, 13, 14 and 15, the order of execution of the blocks may be changed, and/or some of the blocks described may be changed, eliminated, combined and/or subdivided into multiple blocks.

As mentioned above, the example processes of FIGS. 10, 11, 12A, 12B, 12C, 12D, 12E, 12F, 13, 14 and 15 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 10, 11, 12A, 12B, 12C, 12D, 12E, 12F, 13, 14 and 15 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage medium and to exclude propagating signals. Also, as used herein, the terms "computer readable" and "machine readable" are considered equivalent unless indicated otherwise. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 10:
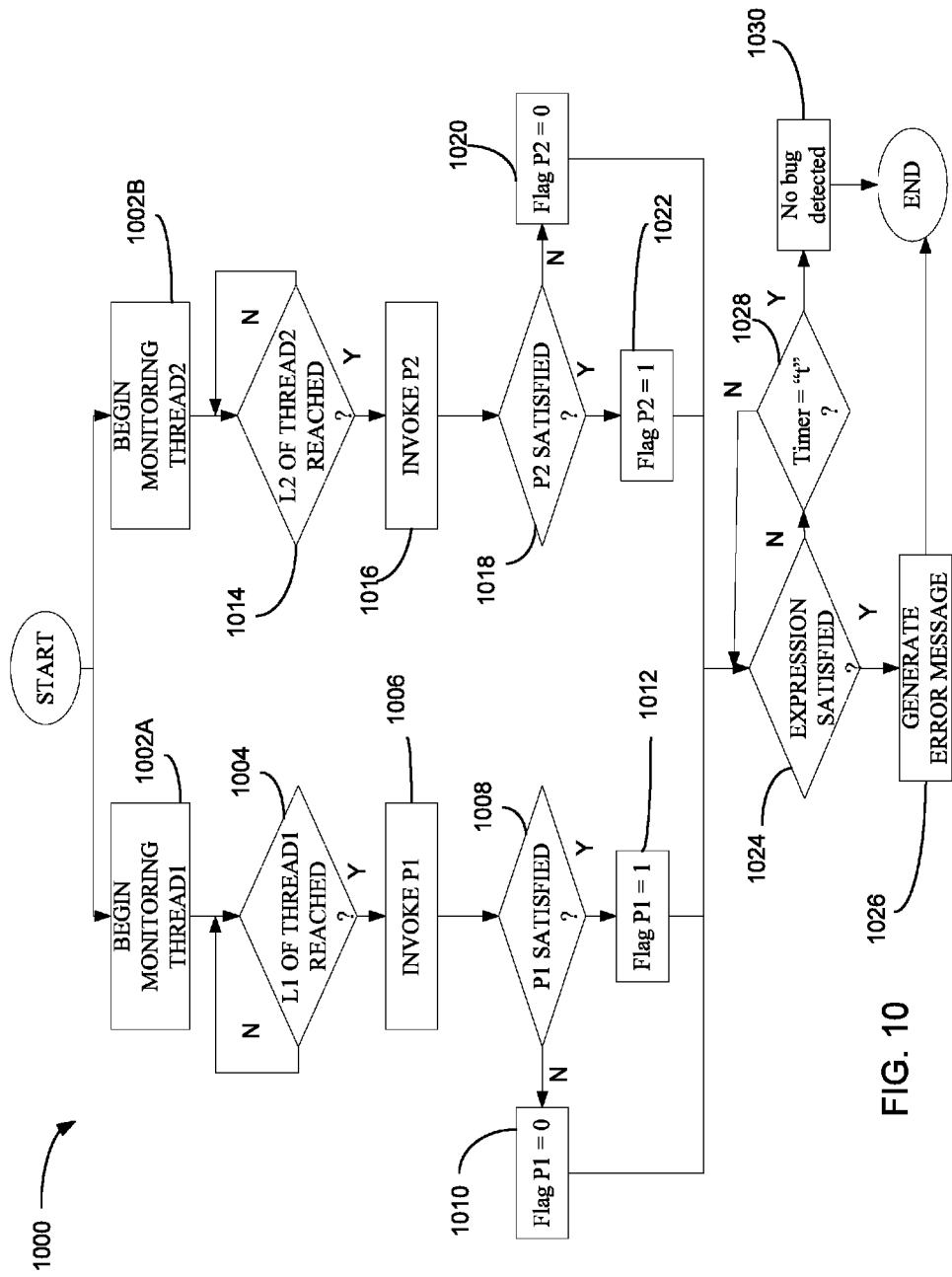
FIG. 10 is a flowchart representative of example machine readable instructions that may be executed to implement the bug detector of FIG. 1 for use in detecting a bug in a generic multi-threaded program.

Example machine readable instructions 1000 that may be executed to implement the bug detector 10 of FIG. 1 are represented by the flowchart shown in FIG. 10. The example machine readable instructions 1000 may be executed at intervals (e.g., predetermined intervals), based on an occurrence of an event (e.g., a predetermined event), etc., or any combination thereof. The machine readable instructions 1000 begin execution and the example controller 12 causes the example thread monitor 14 to begin observing the execution of thread1 and thread2 of the example multi-threaded program 11 (blocks 1002A and 1002B). The example thread monitor 14 determines whether thread1 has progressed to a first location, L1, (block 1004) at which a first predicate, P1, is invoked (block 1006). If L1 has not yet been reached, the example thread monitor 14 continues to observe the progress of thread1 (block 1004). If L1 has been reached, the example thread monitor 14 notifies the example controller 12 and the example controller 12 causes P1 to be invoked (block 1006). The example controller 12 causes the example tester 20 to determine whether P1 has been satisfied (block 1008). If P1 has not been satisfied, the example controller 12 sets a flag, "P1" equal to zero (block 1010). If P1 has been satisfied, the example controller 12 sets a flag "P1" to one (block 1012).

As described above, the example thread monitor 14 begins to observe the operations of thread2 (block 1002B). The example thread monitor 14 determines whether thread2 has progressed to a second location, L2, at which a second predicate, P2, is invoked (block 1014). If L2 has not yet been reached, the example thread monitor 14 continues to observe the progress of thread2 (block 1014). If L2 has been reached, the example thread monitor 14 notifies the example controller 12 and the example controller 12 invokes P2 (block 1016). The example controller 12 causes a tester 20 to determine whether P2 has been satisfied (block 1018). If P2 has not been satisfied, the example controller 12 sets a flag "P2" to zero (block 1020) and if P2 has been satisfied, the example controller 12 sets the flag "P2" to one (block 1022).

In the illustrated example of FIG. 10, the example controller 12 uses the flags P1 and P2 to determine whether an expression has been satisfied (block 1024). If the flags P1 and P2 are such that the expression is satisfied, the error message is generated (block 1026). If the expression is not satisfied, the example controller 12 determines whether a threshold amount of time, "t," has elapsed (block 1028). If "t" has not yet elapsed, the example controller 12 causes the example tester 20 to continue to test to determine whether the expression has been satisfied (block 1024) until the threshold amount of time, "t," has elapsed (block 1028). If "t" has elapsed (block 1028), the bug has not been detected and the example controller 12 causes the bug detector 10 to cease operating (block 1030). In some examples, the predicate expression specifies that both P1 and P2 must be satisfied such that if the flags P1 and P2 are both set to one, the expression tested (block 1024) is satisfied and the error message is generated (block 1026).

In some examples, P1 and/or P2 are associated with one or more conditions. In this example, the example controller 12 determines whether P1 is satisfied by determining whether the conditions specified by P1 are satisfied and the example controller 12 determines whether P2 is satisfied by determining whether the conditions specified by P2 are satisfied. In other examples, P1 and/or P2 can each specify a condition expression. The condition expression specifies a relationship among two or more conditions such that when the relationship among the conditions has been satisfied, the condition expression is satisfied. In yet other examples, P1 and/or P2 specify a manner in which the example thread controller 16 is to control thread1 and/or thread 2, respectively. In some examples, the condition expression and/or the predicate expression can each specify a manner in which the example thread controller 16 is to control thread1 and/or thread2.

Figure 11:
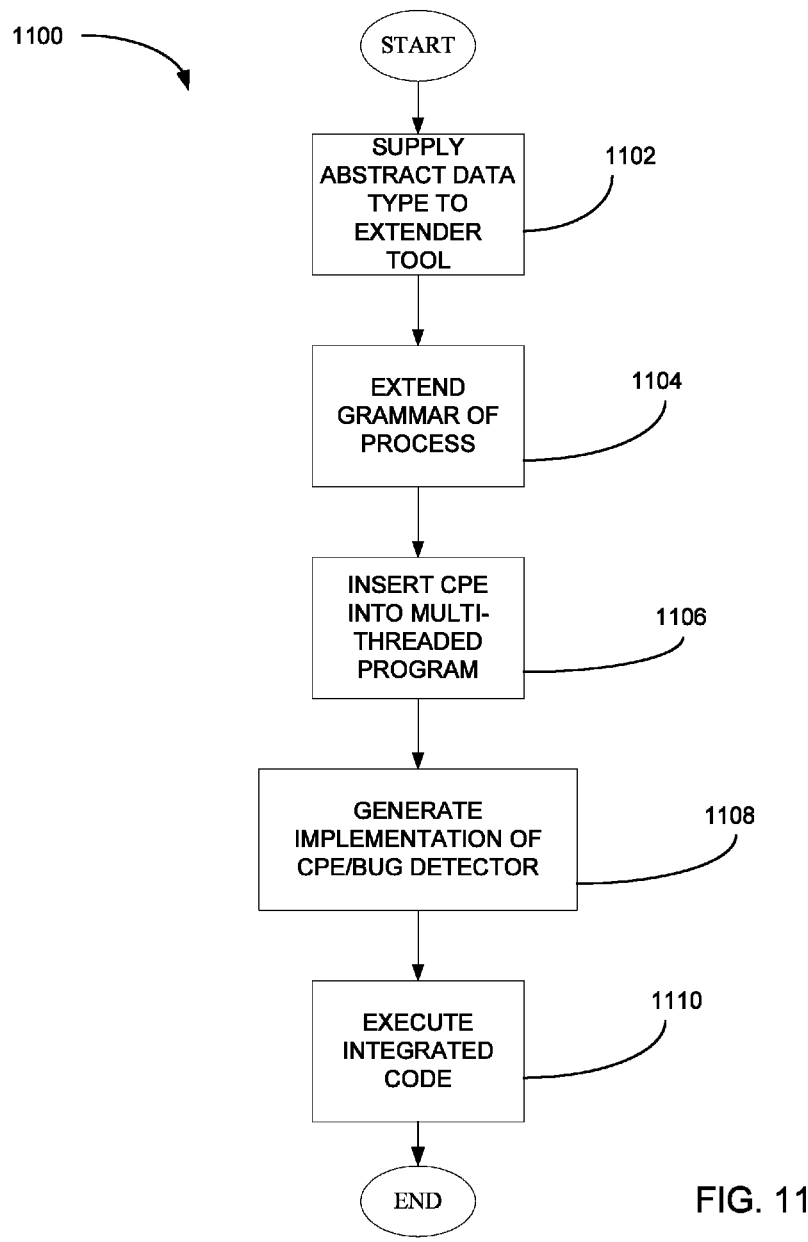
FIG. 11 is a flowchart representative of example machine readable instructions that may be executed to generate and execute a software implementation of a bug detector conforming to the example data type of FIG. 3A.

Example machine readable instructions 1100 that may be executed to implement the bug detector 10 of FIG. 1 using a CPE are represented by the flowchart shown in FIG. 11. The example machine readable instructions 1100 may be executed at intervals (e.g., predetermined intervals), based on an occurrence of an event (e.g., a predetermined event), etc., or any combination thereof. The machine readable instructions 1100 begin execution at a block 1102 of FIG. 11 at which an abstract data type defining a generalized format 212 (see FIG. 2) of the CPE is input to the extender tool 204 of the processor 26 of FIG. 2. The example abstract data type 212 (see FIG. 2) of the CPE can be defined to include a bug name, an error message, a set of predicates and an expression identifying a relationship to be satisfied among/between the predicates to detect a bug. In addition, a set of operators to be used in one or more of the expressions and the function performed by each operator are supplied to the extender tool 204 (see FIG. 2). In some examples, an amount of time that the example thread controller 16 (see FIG. 1) is to control one or more of the threads can also be supplied to the extender tool 204 (see FIG. 2). The extender tool 204 (see FIG. 2) uses the example abstract data type 212 and the operator information to extend the grammar of the processor 26 of FIG. 1 to allow the processor 26 to recognize and process CPEs conforming to the example abstract data type 212 (block 1104).

An example CPE designed to detect a specific type of bug in a specific multi-threaded program is globally defined in the example multi-threaded program and program code invoking each globally defined predicate is inserted at desired locations into the source code of the threads of the example multi-threaded program (block 1106). The location selected for invocation of any given predicate is optimally at or near the portion(s) of the thread that cause the bug or the invocations are located at any position that will allow the bug to be detected. Each predicate identifies specific condition(s) to be satisfied and, in some examples, also identifies a condition expression among/between the conditions that, when satisfied, causes the predicate to be satisfied. As described above, the design of the bug detector 10 and the locations at which to insert the predicates of the bug detector 10 are determined based on the operations of the specific multi-threaded program being debugged and based on the specific type of bug to be detected. The example multi-threaded program having the globally defined CPE and having predicate invocations inserted therein is supplied to the processor 26 for execution.

Prior to execution of the example multi-threaded program supplied, the processor 26 uses the extended grammar to recognize the bug detector 10 and causes the implementation generator 202 to generate a software implementation of the bug detector 10 (block 1108). Also, the processor 26 causes the software implementation of the bug detector 10 to be integrated with the example multi-threaded program to form the integrated program code (block 1108). The processor 26 executes the integrated program code (block 1110), and if the bug is present in the example multi-threaded program, and provided that the CPE has been designed properly, the bug is detected.

Figure 12A:
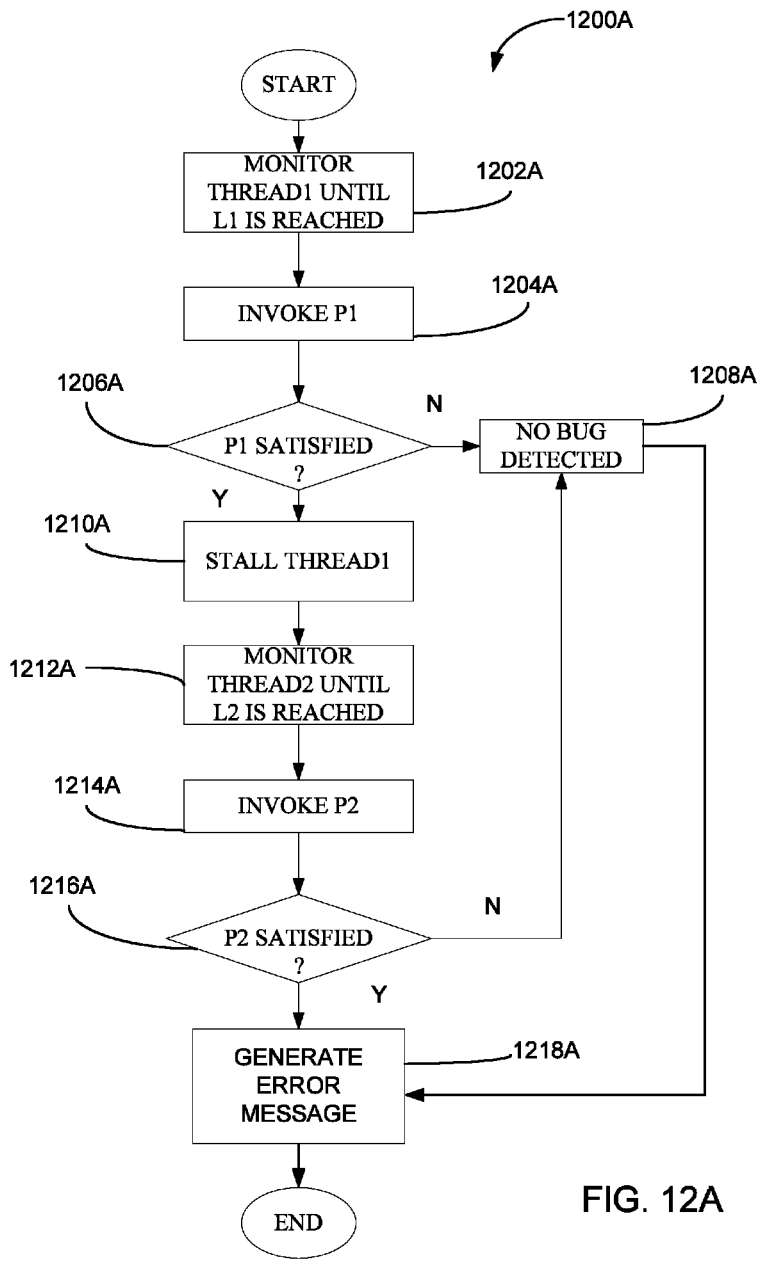
FIG. 12A-12F are flowcharts representative of example machine readable instructions that may be executed to implement a bug detector that evaluates one or more expressions of FIG. 3B.

Example machine readable instructions 1200A, 1200B, 1200C, 1200D, 1200E, and 1200F that may be executed by a bug detector 10 to detect a bug using the example expressions illustrated in FIG. 3B are represented by the flowcharts of FIGS. 12A, 12B, 12C, 12D, 12E, and 12F. Example machine readable instructions 1200A that may be executed to implement the bug detector 10 that evaluates the example expression e1 (P1>&P2) of FIG. 3B are represented by the flowchart of FIG. 12A. The flowchart of FIG. 12A begins when the example controller 12 causes the example thread monitor 14 to monitor the forward progress of thread1 (block 1202A). Upon reaching L1 in thread1, the example controller 12 invokes the predicate P1 (block 1204A) and the example controller 12 causes the example tester 20 to determine whether the predicate P1 associated with thread1 has been satisfied (block 1206A). If P1 has not been satisfied, no bug has been detected and the example controller 12 causes the bug detector 10 to cease operating (block 1208A).

If P1 has been satisfied (block 1206A), the example controller 12 causes a thread controller 16 to stall thread1 for a threshold amount of time (block 1210A) and causes the example thread monitor 14 to begin monitoring thread2 at a block 1212A until L2 is reached. The example controller 12 invokes P2 (block 1214A) and causes the example tester 20 to determine whether P2 has been satisfied (block 1216A). If P2 has not been satisfied, no bug has been detected and the example controller 12 causes the bug detector 10 to cease operating (block 1208A). If P2 has been satisfied, the example controller 12 causes the example message generator 22 to generate an error message indicating that the bug has been detected (block 1218A).

The CPE 402 of FIG. 4 also uses the expression (P1>&P2) to detect a bug as shown in FIG. 4 such that the flowchart of FIG. 12A can also be used to represent the operations used by the CPE 402 of FIG. 4 to evaluate the expression (P1>&P2).

In this example, the example CPE 402 is globally defined and the predicates are defined and inserted into the example multi-threaded program as described above in connection with FIG. 4. Using the CPE 402 parameters and predicates defined in FIG. 4, the CPE evaluates the expression (P1>&P2) to determine whether a bug is detected in the manner described above with respect to FIG. 12A.

The CPE 502 of FIG. 5 uses the expression (P2>&P1) to detect a bug in the example multi-threaded program of FIG. 5 such that the flowchart of FIG. 12A can also be used (with minor modification) to represent the operations used by the CPE 502 of FIG. 5. In this example, the CPE is globally defined and the predicates are defined and inserted into the example multi-threaded program as described above in connection with FIG. 5. Here, the operation of the bug detector 10 is modified such that the example thread monitor 14 monitors thread2 (block 1202A) until L2 is reached and then the example controller 12 invokes P2 (block 1204A). The example controller 12 causes the example tester 20 to determine whether P2 has been satisfied (block 1206A). If so, then thread2 is stalled for a threshold amount of time (block 1210A). Once thread 2 is stalled, the example controller 12 causes the example thread monitor 14 to monitor the progress of thread1 (block 1212A). When L1 is reached, the example controller 12 invokes P1 (block 1214A) and causes the example tester 20 to determine whether P1 has been satisfied (block 1216A). If P1 is satisfied, the bug is detected and the example controller 12 causes the example message generator 22 to output the error message (block 1218A).

Figure 12B:
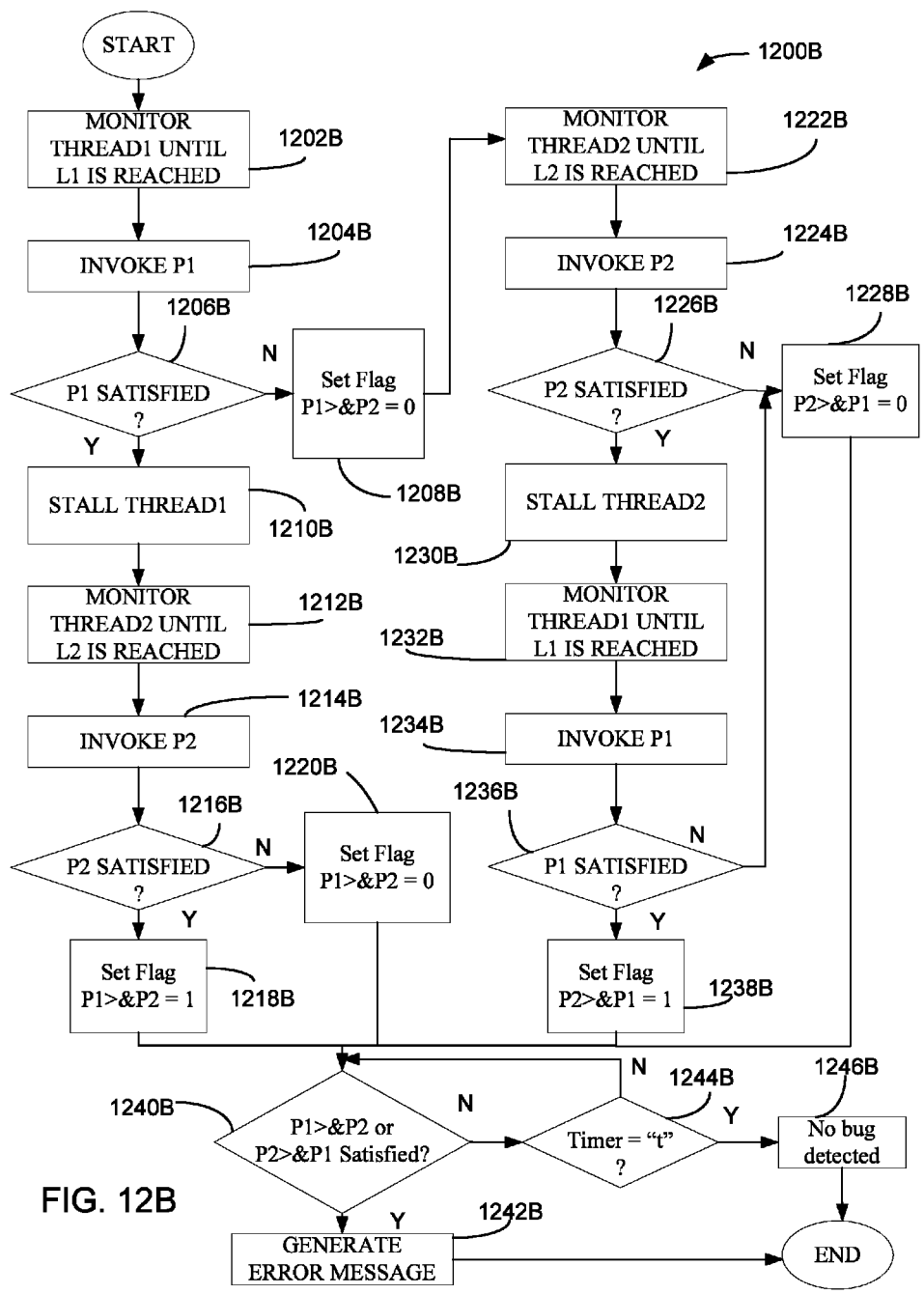

Example machine readable instructions 1200B that may be executed to implement a bug detector 10 that evaluates the example expression e2 (P1&&P2) of FIG. 3B are represented by the flowchart of FIG. 12B. As described above in connection with FIG. 3B, the expression (P1&& P2) is equivalent to the expression (P1>&P2) or (P2>&P1). The flowchart of FIG. 12B begins at a block 1202B. In this example, the operations represented by the blocks 1202B, 1204B, 1206B, 1210B, 1212B, 1214B, and 1216B are the same operations represented by the blocks 1202A, 1204A, 1206A, 1210A, 1212A, 1214A, and 1216A, respectively, of FIG. 12A and represent the manner in which the example controller 12 determines whether P1>&P2 has been satisfied. If P2 is satisfied (block 1216B), then P1>&P2 is satisfied and a flag "P1>&P2" is set to one (block 1218B). If P2 is not satisfied (block 1216B), then P1>&P2 is not satisfied and a flag "P1>&P2" is set to zero (block 1220B).

If P1 is not satisfied (block 1206B), then P1>&P2 is not satisfied and the flag "P1>&P2" is set to zero (block 1208B). The example controller 12 begins to monitor thread2 (block 1222B) until L2 is reached at which time the example controller 12 invokes P2 (block 1224B). The example controller 12 causes the example tester 20 to determine whether P2 is satisfied (block 1226B). If P2 is not satisfied (block 1226B), then P2>&P1 is not satisfied and a flag "P2>&P1" is set to zero (block 1228B). If P2 is satisfied (block 1226B), the example controller 12 causes the example thread controller 16 to stall thread2 (block 1230B) and begin monitoring thread1 until L1 is reached (block 1232B). The example controller 12 invokes P1 (block 1234B) and the example controller 12 causes the example tester 20 to determine whether P1 is satisfied (block 1236B). If P1 is not satisfied, then P2>&P1 has not been satisfied and the flag "P2>&P1" is set to zero (block 1228B) as described above. If P1 is satisfied (block 1236B), then P2>&P1 has been satisfied and the flag "P2>&P1" is set to one (block 1238B).

The example controller 12 causes the example tester to use the flag "P1>&P2" and the flag "P2>&P1" to determine whether the expression (P1&&P2) has been satisfied (block 1240B). If either of the flags "P1>&P2" or "P2>&P1" are set to one then the expression (P1&&P2) is satisfied and the example controller 12 causes the example message generator 22 to generate the error message (block 1242B). If neither of the flags "P1>&P2" or "P2>&P1" are set to one when tested (block 1240B), the example controller 12 determines whether a threshold amount of time "t" has elapsed (block 1244B). If the threshold amount of time "t" has not yet elapsed (block 1244B), then the example controller 12 again tests to determine whether the expression (P1&&P2) has been satisfied (block 1240B). If the threshold amount of time "t" has elapsed (block 1244B), then the bug has not been detected and the example controller 12 causes the bug detector 10 to cease operating (block 1246B).

Figure 12C:
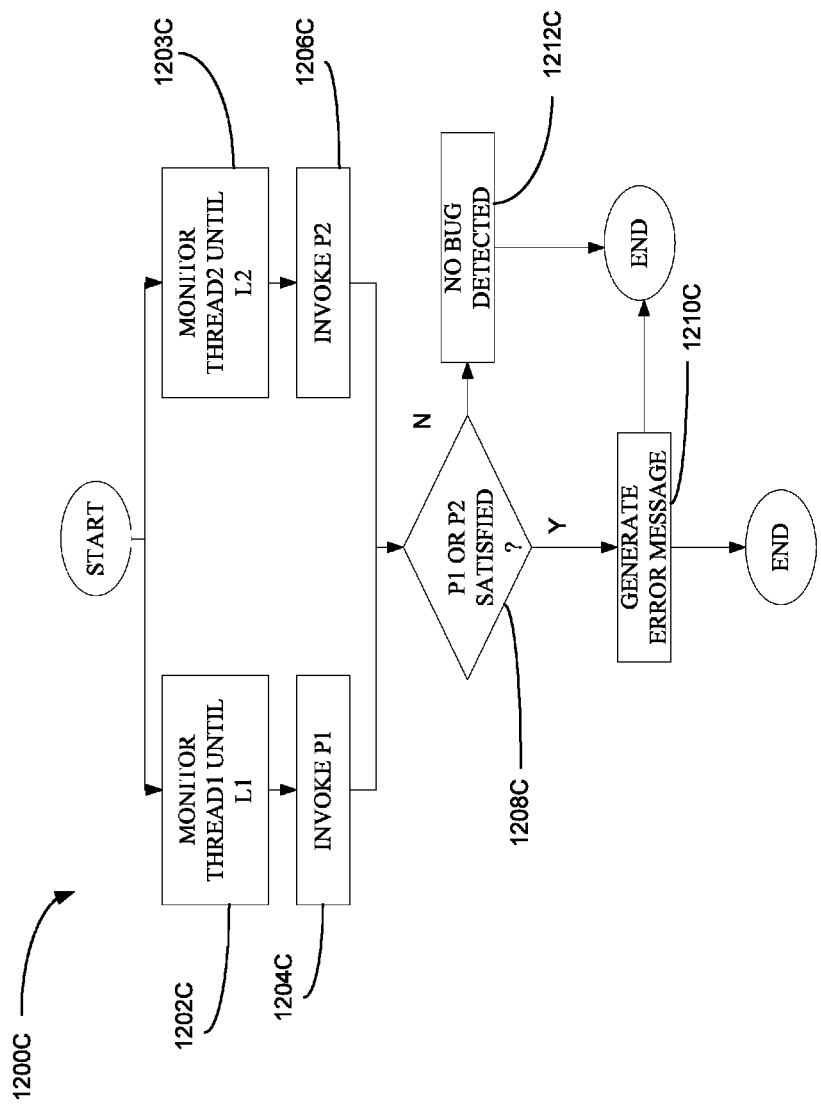

Example machine readable instructions 1200C that may be executed to implement the CPE evaluating the example expression e3 (P1||P2) of FIG. 3B are represented by the flowchart of FIG. 12C. As described above in connection with FIG. 3B, the expression (P1||P2) is equivalent to the expression (P1 or P2). The machine readable instructions of the flowchart of FIG. 12C begin when the example controller 12 causes the example thread monitor 14 to monitor thread1 until L1 is reached and thread2 until L2 is reached, respectively (blocks 1202C and 1203C). The example controller 12 invokes P1 (block 1204C) and P2 (block 1206C). The example controller 12 causes the example tester 20 to determine whether P1 or P2 is satisfied (1208C). If either predicate is satisfied, the example controller 12 causes the example message generator 22 to generate the error message (block 1210C). Otherwise, the bug has not been detected and the bug detector 10 ceases operation (block 1212C).

As described above, the CPE 602 of FIG. 6 uses the expression (P11&&P22||P21&&P22) to detect a bug in the example multi-threaded program of FIG. 6 such that the flowchart of FIGS. 12B and 12C can be used in combination to represent the operations used by the CPE 602 of FIG. 6 to evaluate the expression. In this example, the CPE is globally defined and the predicates are defined and program code invoking the predicates is inserted into the example multi-threaded program as described above in connection with FIG. 6. Here, the operations performed at the blocks 1202C and 1204C of FIG. 12C are replaced with operations represented by the blocks 1202B through 1238B of FIG. 12B. For the blocks 1202B through 1238B, all references to P1 are replaced with references to P11 and all references to P2 are replaced with P22. In this fashion, the operations are modified to determine whether either P11>& P22 or P22>&P11 is satisfied. The operations represented by the blocks 1203C and 1206C of FIG. 12C are also replaced with the operations represented by the blocks 1202B through 1238B of FIG. 12B but here all references to P1 are replaced with references to P12 and all references to P2 are replaced with P21. In this fashion, the operations are modified to determine whether either P12>&P21 or P21>&P12 is satisfied. The example controller 12 tests to determine whether any of 1) P11>& P22 2) P22>&P11 3) P12>& P21 or 4) P21>&P12 are satisfied (block 1208C of FIG. 12C). If the example controller 12 determines that any of these four combinations of P11, P12, P22, and P21 are satisfied, the bug is detected and the example controller 12 causes the example message generator 22 to generate the error message (block 1210C). If none of the combinations of P11, P12, P22 and P 21 are satisfied, the bug is not detected and the example controller 12 causes the bug detector 10 to cease operating (block 1212C). In some examples, the example controller 12 may continue to test the combinations of P11, P12, P22 and P21 for a threshold amount of time before determining that the bug has not been detected (block 1212C).

Figure 12D:
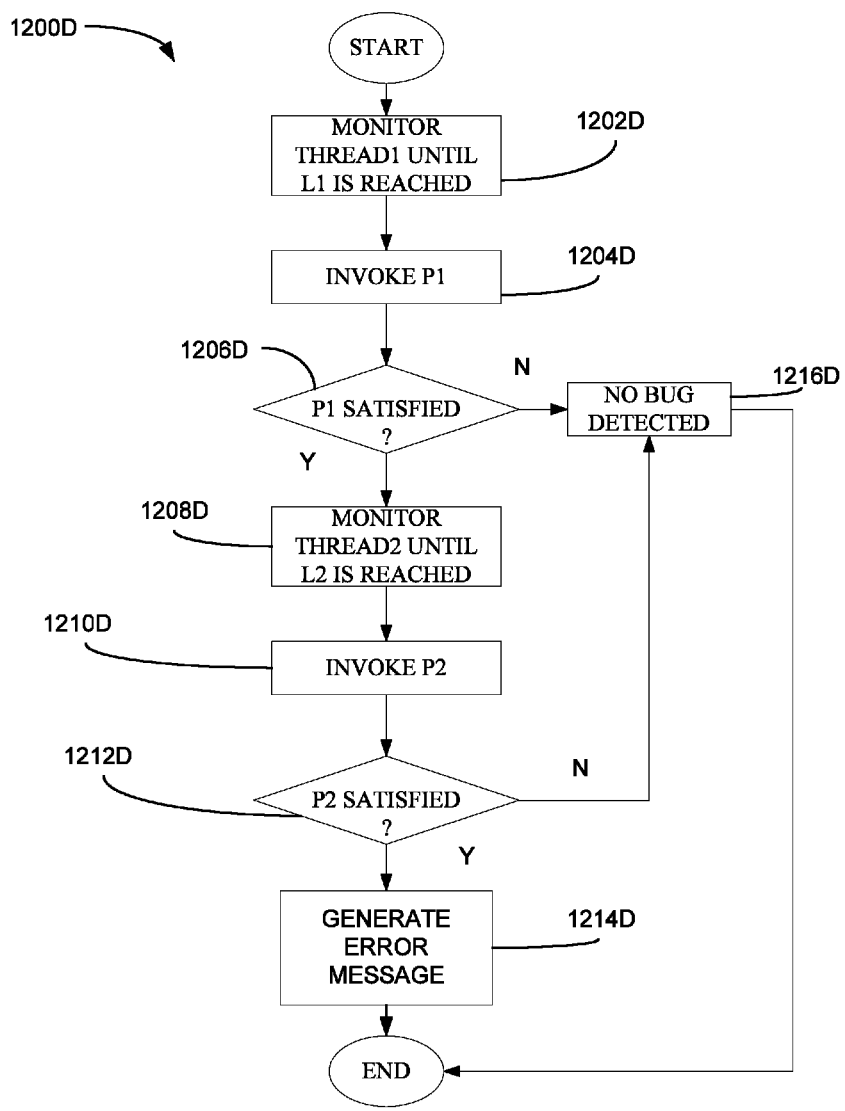

Example machine readable instructions 1200D that may be executed to implement the example expression e4 (P1>P2) of FIG. 3B are represented by the flowchart of FIG. 12D. As described above in connection with FIG. 3B, the expression (P1>P2) is satisfied when P1 is satisfied before P2 is satisfied. The machine readable instructions represented by the flowchart of FIG. 12D begin when the example controller 12 causes the example thread monitor 14 thread monitor 14 to monitor the forward progress of thread1 until L1 is reached (block 1202D). Upon reaching L1, the example controller 12 invokes P1 (block 1204D) and then causes the example tester 20 to determine whether P1 is satisfied (block 1206D). If P1 is satisfied, the example controller 12 monitors thread2 until to L2 is reached (block 1208D) and the example controller 12 then invokes P2 (block 1210D). The example controller 12 tests to determine whether P2 is satisfied (block 1212D). If P2 is satisfied, the expression P1>P2 is satisfied and the example message generator 22 generates an error message (block 1214D). Otherwise, the bug has not been detected and bug detector 10 ceases operating (block 1216D). Likewise, if P1 is not satisfied (block 1206D), the bug has not been detected and bug detector 10 ceases operating (block 1216D).

Figure 12E:
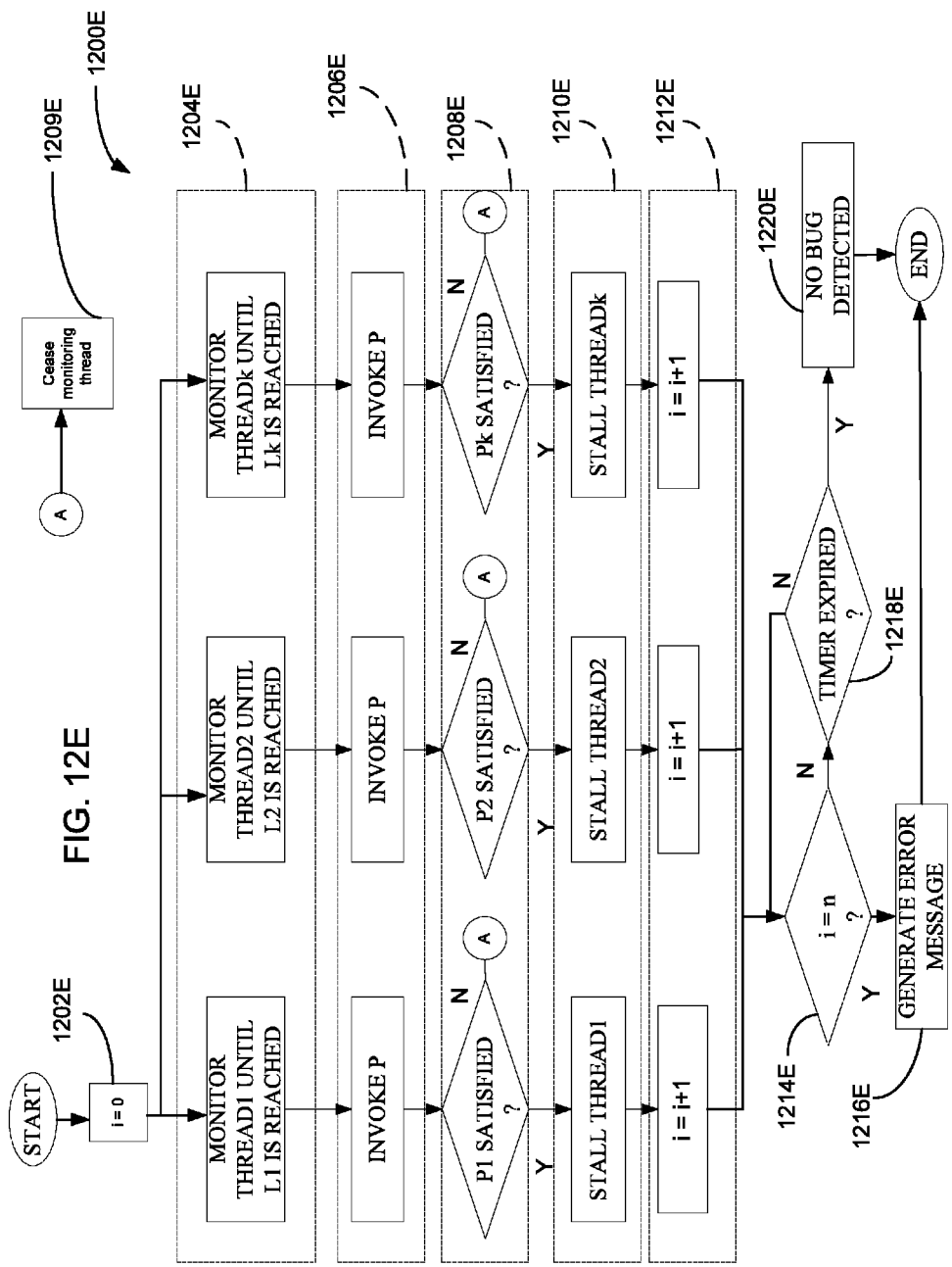

Example machine readable instructions 1200E that may be executed to implement the example expression e5 (P^n) of FIG. 3B are represented by the flowchart of FIG. 12E. As described above in connection with FIG. 3B, the expression e5 (P^n) is satisfied when a predicate, "P," has been concurrently satisfied in a threshold number of threads, "n." The flowchart begins when the example controller 12 sets a counter, "i," equal to zero (block 1202E). The counter represents the number of threads in which the predicate has been satisfied. The example controller 12 causes a thread monitor 14 to monitor the forward progress in each of a plurality of "k" where k represents the number of threads being monitored and where k is greater than or equal to n (block 1204E). Each thread is monitored until reaching a location at which P is invoked. The example controller 12 invokes P (block 1206E), and then causes the example tester 20 to determine whether the predicate is satisfied (block 1208E). If P is not satisfied, the example controller 12 causes the example thread monitor 14 to cease monitoring of the relevant thread (block 1209E). If P is satisfied in any given thread, the example controller 12 causes the example thread controller 16 to stall that thread (block 1210E) and then causes the counter, "i," to be incremented by one. The example controller 12 causes the example tester 20 to determine whether the counter, "i," is equal to n (block 1214E). If the number of stalled threads i reaches n, the bug is detected and the example controller 12 causes the example message generator 22 to generate an error message (block 1216E). If the number of stalled threads i does not reach n within a threshold amount of time, "t," (block 1218E), the example controller 12 causes the example thread controller 16 to unstall the stalled threads and the bug detector 10 ceases operating (block 1220E).

Figure 12F:
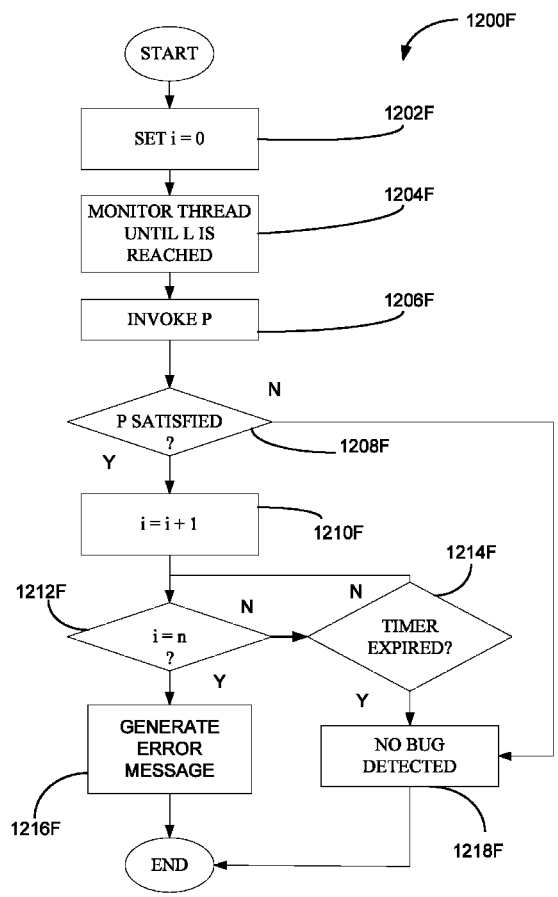

Example machine readable instructions 1200F that may be executed to implement the example expression e6 (P#n) of FIG. 3B are represented by the flowchart of FIG. 12F. As described above in connection with FIG. 3B, the expression (P#n) is satisfied when a predicate has been satisfied (though not necessarily concurrently) in a threshold number of threads, "n." The machine readable instructions represented by the flowchart of FIG. 12F begin when the example controller 12 sets a counter, "i," equal to zero (block 1202F). The example controller 12 causes a thread monitor 14 to monitor the forward progress of a thread until a predefined location reached (block 1204F). The example controller 12 invokes a predicate, P (block 1206F), and causes the example tester 20 to determine whether P is satisfied (block 1208F). If P is satisfied, the example controller 12 causes the counter, "i," to be incremented by one (block 1210F). The operations represented by the blocks 1204F through 1210F are performed in each of a plurality of "k" threads where k represents a number of threads being monitored. The example controller 12 causes the example tester 20 to determine whether the counter, "i," is equal to n where "n" is less than or equal to "k" (block 1212F). If "i," is not equal to "n" the example controller 12 determines whether a threshold amount of time t has elapsed (block 1214F). If not, then the example controller 12 again tests to determine whether "i," is equal to n (block 1212F). If "i," is equal to "n" (block 1212F), the number of threads having satisfied P has reached the threshold amount "n," the bug is detected and the example controller 12 causes the example message generator 22 to generate an error message (block 1216F). If the counter "i," does not reach "n" within the threshold amount of time, "t," the bug detector 10 ceases operating (block 1218F).

Figure 13:
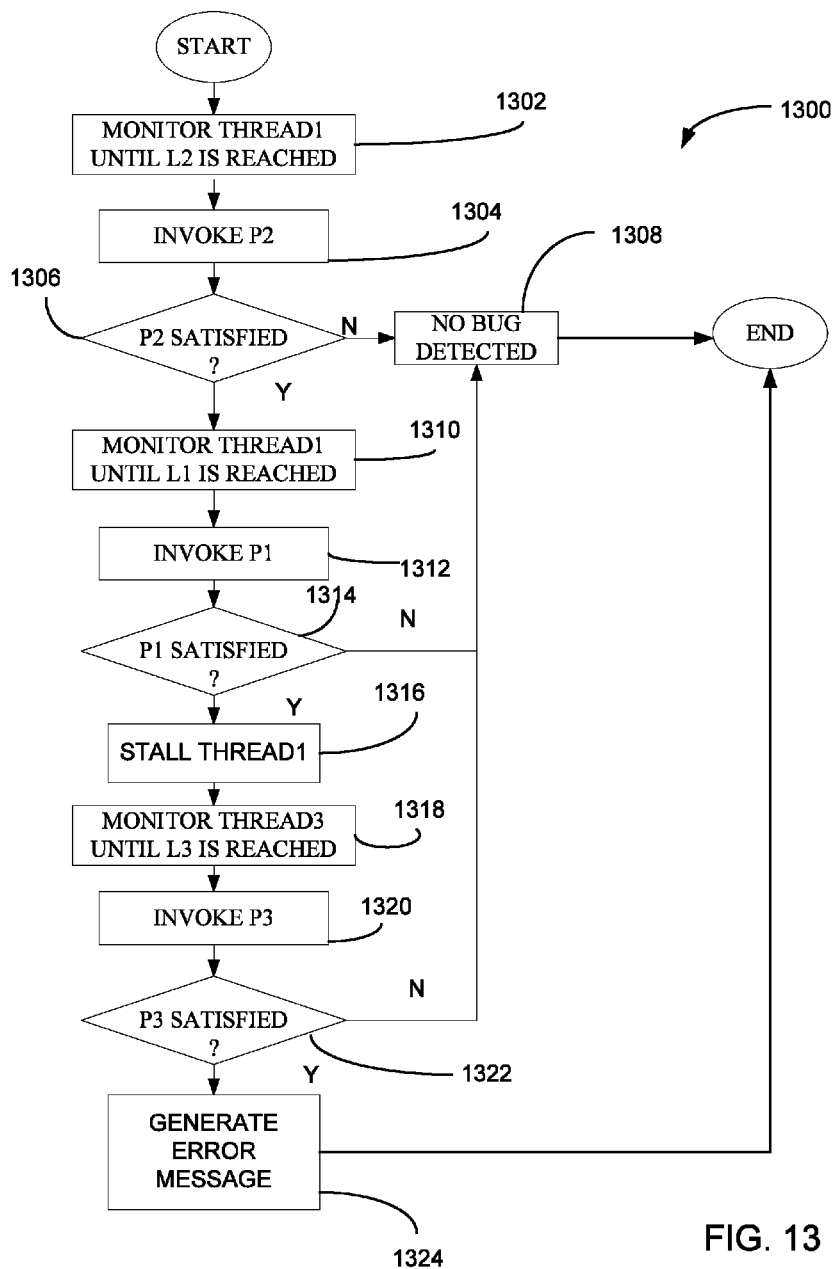
FIG. 13 is a flowchart representative of example machine readable instructions that may be executed to implement the bug detector of FIG. 7.

Example machine readable instructions 1300 that may be executed to implement the bug detector 10 of FIG. 7 are represented by the flowchart shown in FIG. 13. In this example, the bug detector 10 detects a divide by zero violation occurring in the example multi-threaded program that operates according to the pseudocode of FIG. 7. Here, the CPE is globally defined and the predicates are defined and inserted into the example multi-threaded program as described above in connection with FIG. 7. The example machine readable instructions 1300 represented by the flowchart of FIG. 13 begin when the example controller 12 causes the example thread monitor 14 to monitor the forward progress of thread2 until L2 is reached (block 1302). In this example, thread2 executes in the same manner as described with respect to FIG. 7. The example controller 12 invokes P2 (block 1304). When P2 is invoked, the example controller 12 causes the example tester 20 to determine whether P2 has been satisfied, (i.e., whether the container is empty) (block 1306). Likewise, thread1 executes in the same manner described with respect to FIG. 7A until the example thread monitor 14 observes that line L1 is reached (block 1310). The example controller 12 causes P1 to be invoked (block 1312). When P1 is invoked, the example controller 12 causes the example tester 20 to determine whether P1 is satisfied (block 1314) to ensure that the value of the variable "total" is not equal to zero. If the variable "total" is equal to zero, then dividend of the "ave" calculation will be equal to zero such that the calculation of "ave" will not result in a divide by zero exception even though the container may be empty. If P1 is not satisfied, the bug has not been detected and the example controller 12 causes the bug detector 10 to cease operating (block 1308). After P1 is satisfied, thread1 is stalled (block 1316) and the example controller 12 causes the example thread monitor 14 to monitor thread3 until L3 is reached (block 1318). Thread 3 is invoked (block 1320) and the example controller 12 causes the example tester 20 to determine whether P3 is satisfied (block 1322). In this example, P3 is satisfied if the container becomes empty provided that "total" is a non zero value and subject to a stall(5) condition. When P1, P2 and P3 are all satisfied in accordance with the relationship specified in the global definition of CPE4 (i.e., (P2(>P1>&P3))), the bug is detected and the example controller 12 causes the example message generator 22 to generate the error message (block 1324). If P3 is not satisfied, the bug has not been detected and the example controller 12 causes the bug detector 10 to cease operating (block 1308). Likewise, if P2 is not satisfied (block 1306), the bug detector 10 ceases operating (block 1308). As described above, the bug can be detected solely through the use of P3, however, the predicates P1 and P2 are helpful in determining where the undesired interleaving originated in thread1 and thread2 and can then be used to repair the bug.

Example machine readable instructions 1400 that may be executed by the processor 26 of FIG. 2 to implement an automatically generated software implementation of the CPE 300 of FIG. 3A are represented by the flowchart of FIG. 14. In this example, the software implementation is generated by the implementation generator 202, is integrated with the example multi-threaded program 11 by the integrator 206 to form the integrated program code and is then executed by the thread executor 208 of the processor 26 to detect the bug. In this example, the software implementation executed by the processor 26 is described with reference to a set of pseudocode illustrated in FIG. 8. Here, the CPE to be generated is designed to detect a "sample bug" associated with the example multi-threaded program 11 and is globally defined as reflected by the lines CPE1-CPE4 of the pseudocode of FIG. 8. The example of FIG. 14 is intended to illustrate a generic software implementation of a CPE that evaluates the expression P1&&P2. As described above, the expression (P1&& P2) is satisfied when either (P1>&P2) or (P2>&P1) is satisfied. Because the software implementation is intended to be generic, the conditions associated with thread1 and thread2, the locations at which the program code invoking P1 and P2 are inserted into the example multi-threaded program 11, and the specific operation of the example multi-threaded program 11 are not relevant to the manner in which the expression P1&&P2 is evaluated by the CPE and thus are not described herein.

The machine readable instructions represented in the flowchart of FIG. 14 when the processor 26 initializes a set of variables to indicate that P1 and P2 are not satisfied as described with reference to lines I1 and I2 of the pseudocode of FIG. 8 (block 1402). The processor 26 determines whether (P1>&P2) is satisfied as described above with reference to lines I4-I7 of the pseudocode of FIG. 8 (block 1404). The processor 26 determines whether (P2>&P1) is satisfied as is described with reference to lines I8-I11 of the pseudocode of FIG. 8 (block 1406). The processor 26 indicates that the bug has been detected if either (P1>&P2) or (P2>&P1) are true and indicates that the bug has not been detected if neither (P1>&P2) nor (P2>&P1) are true as described with reference to lines I12-I14 of the pseudocode of FIG. 8 (1408). The processor 26 performs a set of operations to reset the status of P1 and P2 to not satisfied and to output the error message if the bug was not found (as determined by the operations performed at lines I15-I17 of FIG. 8) (block 1410).

In the illustrated example of FIG. 15, an example set of operations is described using pseudocode that represents an example implementation of a CPE designed to detect a "sample bug2" associated with the example multi-threaded program 11 as described with reference to FIG. 9. In this example, the software implementation is generated by the implementation generator 202 (see FIG. 2), is integrated with the example multi-threaded program 11 by the integrator 206 (see FIG. 2) to form the integrated program code and is then executed by the thread executor 208 (see FIG. 2) of the processor 26 to detect the bug. Here, the CPE to be generated is globally defined at the lines CPE1-CPE3 of the pseudocode of FIG. 9. The example of FIG. 15 is intended to illustrate a generic software implementation of a CPE that evaluates the expression (P0>(P1^2&P2^3)#3). Thus, the sample bug2 will be detected when P0 is satisfied in one thread before a combination of P1 and P2 are repeatedly satisfied three times. Here, the combination of P1 and P2 is satisfied when P1 has been concurrently satisfied in two threads and P2 has been concurrently satisfied in three threads. In this example, P1 is inserted into at least two or more threads, P2 is inserted into at least three threads and P0 is inserted into at least one thread. The conditions associated with P0, P1 and P2, the locations at which program code invoking P0, P1 and P2 are inserted in any given thread of the example multi-threaded program, and the specific operation of the example multi-threaded program 11 itself are not relevant to the manner in which the expression (P0>(P1^2&P2^3) #3) is evaluated by the CPE and thus are not described herein.

The flowchart of FIG. 15 begins when the processor 26 initializes a set of variables as described above with reference to lines I1-I6 of FIG. 9 (block 1502). The example processor 26 determines whether P0 has been satisfied as described with reference to lines I7-I8 of FIG. 9 (block 1504).

The processor 26 increments the number of times P1 has been satisfied by one each time the condition associated with P1 has been satisfied and waits a threshold amount of time for either (P1^2>&P2^3) to be satisfied or for (P2^3>&P1^2) to be satisfied as described above with reference to lines I9-I13 of FIG. 9 (block 1506).

The processor 26 increments the number of times P2 has been satisfied by one each time the condition associated with P2 has been satisfied and then waits a threshold amount of time for either (P1^2>&P2^3) to be satisfied or for (P2^3>&P1^2) to be satisfied as described above with reference to the lines I14-I17 of the pseudocode of FIG. 9 (block 1508).

The processor 26 increments the variable "num_repeats" by one each time the expression (P1^2 && P2^3) is satisfied as described above with reference to the lines I18-I19 of the pseudocode of FIG. 9 (block 1510). The processor 26 resets the status of P1 and P2 and P0 to indicate that they are not satisfied and generates the error message if the bug has been detected as described above with reference to lines 20-23 of the pseudocode of FIG. 9 (block 1512).

FIG. 16 is a block diagram of an example processing system 1600 capable of implementing example apparatus and methods disclosed herein. The processing system 1600 can be, for example, a server, a personal computer, a personal digital assistant (PDA), cell phone, an Internet appliance, or any other type of computing device.

The system 1600 of the instant example includes a processor 1612 such as a general purpose programmable processor. The example processor 1612 includes a local memory 1614, and executes coded instructions 1616 present in the local memory 1614 and/or in another memory device. The example processor 1612 may execute, among other things, the machine readable instructions represented in FIGS. 4-15. The example processor 1612 may be any type of processing unit, such as one or more Intel® microprocessors from the Pentium® family, the Itanium® family and/or the XScale® family, one or more microcontrollers from the ARM® and/or PICO families of microcontrollers, etc. Of course, other processors from other families and/or manufacturers are also appropriate.

The example processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM)

and/or any other type of random access memory device. The non-volatile memory 1620 may be implemented by flash memory and/or any other desired type of memory device. Access to the main memory 1618, 1620 is typically controlled by a memory controller (not shown).

The processing system 1600 also includes an interface circuit 1624. The interface circuit 1624 may be implemented by any type of interface standard, such as an Ethernet interface, a universal serial bus (USB), and/or a PCI express interface.

One or more input devices 1626 are connected to the interface circuit 1624. The input device(s) 1626 permit a user to enter data and commands into the example processor 1612. The input device(s) can be implemented by, for example, a keyboard, a mouse, a touchscreen, a track-pad, a trackball, an isopoint and/or a voice recognition system.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, typically includes a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1600 also includes one or more mass storage devices 1630 for storing machine readable instructions and data. Examples of such mass storage devices 1630 include floppy disk drives, hard drive disks, compact disk drives and digital versatile disk (DVD) drives. In some examples, the mass storage device 1630 may implement the memories 24 and 27.

The coded instructions 1632 of FIGS. 10-15 may be stored in the mass storage device 1630, in the volatile memory 1618, in the non-volatile memory 1620, in the local memory 1614 and/or on a removable storage medium, such as a CD or DVD 1632.

As an alternative to implementing the methods and/or apparatus described herein in a system such as the processing system of FIG. 16, the methods and/or apparatus described herein may be embedded in a structure such as a processor 26 and/or an ASIC (application specific integrated circuit).

An example method to detect a concurrency bug in a multi-threaded program disclosed herein includes defining, with a processor, a data type. In some examples, the data type comprises a first predicate and a second predicate. The first predicate is associated with a first thread of the multi-threaded program and the second predicate is associated with a second thread of the multi-threaded program. In some examples, the first predicate is associated with a first condition and the second predicate being associated with a second condition. In some examples, the data type comprises an expression that defines a relationship between the first predicate and the second predicate and the relationship, when satisfied, causes the concurrency bug to be detected. In some example methods the relationship specifies an order in which the first predicate and the second predicate are to be satisfied.

Some example methods also include defining a concurrency bug detector conforming to the data type, where defining the concurrency bug detector includes defining the first condition and the second condition. Some example methods also include inserting a first program instruction invoking the first predicate into the first thread, and inserting a second program instruction invoking the second predicate into the second thread. The first program instruction can be inserted at a first location in the first thread and the second program instruction can be inserted at a second location in the second thread. In some example methods, when the first program instruction and the second program instruction are invoked, one or more operations of the first thread are interleaved relative to the one or more operations of the second thread.

Some example methods also include defining a set of parameters associated with the concurrency bug detector. In some example methods, the expression can be a predicate expression, the first condition can be a plurality of first conditions, and the first predicate can be associated with a condition expression that defines a relationship between the plurality of first conditions.

In some example methods the data type can include a name of the concurrency bug that includes an error message generated when the concurrency bug is detected. The error message can identify, at least one of a first location in the first thread or a second location in the second thread. Some example methods, also include extending a compiler to generate an implementation of a concurrency bug detector conforming to the data type and in some example methods, the first condition and the second condition are the same condition.

An example apparatus to detect a concurrency bug in a multi-threaded program disclosed herein includes a processor, and a memory to store machine readable instructions and a data type. In some examples, the data type includes a first program instruction that invokes a first predicate specifying a first condition and includes a second program instruction that invokes a second predicate specifying a second condition. In some examples, the data type can also include an expression that defines a relationship between the first predicate and the second predicate and a set of parameters associated with the data type that are globally defined within the multi-threaded program. The first program instruction can be inserted into a first thread of the multi-threaded program and the second program instruction can be inserted into a second thread of the multi-threaded program. In some examples, the example apparatus also includes an invoker to invoke the first program instruction and the second program instruction, and a tester to determine whether the first predicate and the second predicate are satisfied when invoked by the invoker.

In some examples the apparatus can include a tester to determine whether the expression is satisfied and a thread controller to control operations of a first thread of the multi-threaded program relative to the operations of a second thread of the multi-threaded program.

In some examples the apparatus cam include a thread monitor to monitor a first thread of the multi-threaded program for the first program instruction and to monitor a second thread of the multi-threaded program for the second program instruction. The apparatus can also include a message generator to generate an error message if the tester determines that the expression is satisfied. The error message can identify at least one of a first location in the first thread or a second location in the second thread.

In some examples disclosed herein a machine readable storage medium includes instructions that cause a machine to at least recognize a concurrency bug detector conforming to a data type. The data type can be defined to include a first predicate associated with a first thread of a multi-threaded program and can be associated with a first condition and a can be defined to include a second predicate associated with a second thread of the multi-threaded program and the second thread being associated with a second condition. In some examples, the data type also includes an expression that defines a relationship between the first predicate and the second predicate. In some examples, the machine readable instructions can also cause the machine to determine whether the first predicate and second predicates are satisfied and determine whether the expression is satisfied. In some examples, the data type further includes an error message and the instructions further cause the machine to generate an error message when the expression is satisfied.

Finally, although certain example methods, apparatus and articles of manufacture have been described herein, the scope of coverage of this patent is not limited thereto. On the contrary, this patent covers all methods, apparatus and articles of manufacture fairly falling within the scope of the claims of the patent either literally or under the doctrine of equivalents.

What is claimed is:

1. A method comprising:
defining, with a processor, a data type comprising:
a first predicate associated with a first thread of a multi-threaded program, the first predicate being associated with a first condition;
a second predicate associated with a second thread of the multi-threaded program, the second predicate being associated with a second condition; and
an expression, the expression defining a relationship between the first predicate and the second predicate, the expression to be used to determine whether the relationship between the first predicate and the second predicate is present, and to cause a concurrency bug to be detected when the relationship is present.

2. A method as defined in claim 1, further comprising:
defining a concurrency bug detector conforming to the data type, wherein defining the concurrency bug detector comprises defining the first condition and the second condition;
inserting a first program instruction invoking the first predicate into the first thread; and
inserting a second program instruction invoking the second predicate into the second thread.

3. A method as defined in claim 2, wherein the first program instruction and the second program instruction are inserted at a first location in the first thread and a second location in the second thread, respectively.

4. A method as defined in claim 2, wherein the first program instruction and the second program instruction, when invoked, cause an interleaving of one or more operations of the first thread relative to one or more operations of the second thread.

5. A method as defined in claim 2, further comprising globally defining a set of parameters associated with the concurrency bug detector.

6. A method as defined in claim 2, wherein the expression is a predicate expression, the first condition is a plurality of first conditions, and the first predicate is associated with a condition expression, the condition expression defining a relationship between the plurality of first conditions.

7. A method as defined in claim 1, wherein the relationship specifies an order in which the first predicate and the second predicate are to be satisfied.

8. A method as defined in claim 1, wherein the data type further comprises a name of the concurrency bug, the concurrency bug name comprising an error message to be generated when the concurrency bug is detected, the error message to identify at least one of a first location in the first thread or a second location in the second thread.

9. A method as defined in claim 1 further comprising extending a compiler to generate an implementation of a concurrency bug detector conforming to the data type.

10. A method as defined in claim 1, wherein the first condition and the second condition are the same condition.

11. An apparatus to detect a concurrency bug in a multi-threaded program, the apparatus comprising:
a processor;
a memory to store machine readable instructions and a data type, the data type comprising:
a first program instruction invoking a first predicate, the first predicate specifying a first condition;
a second program instruction invoking a second predicate, the second predicate specifying a second condition; and
an expression defining a relationship between the first predicate and the second predicate, the expression to be used to determine whether the relationship between the first predicate and the second predicate is present, and to cause a concurrency bug to be detected when the relationship is present.

12. An apparatus as defined in claim 11, wherein a set of parameters associated with the apparatus are globally defined within the multi-threaded program, the first program instruction is inserted into a first thread of the multi-threaded program and a second program instruction is inserted into a second thread of the multi-threaded program.

13. An apparatus as defined in claim 11, the apparatus comprising:
an invoker to invoke the first program instruction and the second program instruction; and
a tester to determine whether the first predicate and the second predicate are satisfied when invoked by the invoker.

14. An apparatus as defined in claim 11, the apparatus comprising:
a tester to determine whether the expression is satisfied.

15. An apparatus as defined in claim 11 further comprising:
a thread controller to control operations of a first thread of the multi-threaded program relative to the operations of a second thread of the multi-threaded program.

16. An apparatus as defined in claim 11 further comprising a thread monitor to monitor a first thread of the multi-threaded program for the first program instruction and to monitor a second thread of the multi-threaded program for the second program instruction.

17. An apparatus as defined in claim 14 further comprising:
a message generator to generate an error message if the tester determines that the expression is satisfied, the error message identifying at least one of a first location in the first thread or a second location in the second thread.

18. A machine readable storage medium comprising instructions which, when executed, cause a machine to at least:
recognize a concurrency bug detector conforming to a data type, the data type being defined to include:
a first predicate associated with a first thread of a multi-threaded program, the first predicate being associated with a first condition;
a second predicate associated with a second thread of the multi-threaded program, the second predicate being associated with a second condition; and
an expression, the expression defining a relationship between the first predicate and the second predicate, the expression to be used to determine whether the relationship between the first predicate and the second predicate is present, and to cause a concurrency bug to be detected when the relationship is present.

19. A machine readable storage medium as defined in claim 18, wherein the machine readable instructions, when executed, further cause the machine to:
    determine whether the first predicate is satisfied;
    determine whether the second predicate is satisfied; and
    determine whether the expression is satisfied.

20. A machine readable storage medium as defined in claim 19, wherein the data type is further defined to include an error message and wherein the machine readable instructions, when executed, further cause the machine to:
    generate the error message when the expression is satisfied.

* * * * *